US007653302B2

(12) United States Patent
Limberis et al.

(10) Patent No.: US 7,653,302 B2
(45) Date of Patent: Jan. 26, 2010

(54) TECHNIQUES FOR TRANSMITTING PERSONAL DATA AND METADATA AMONG COMPUTING DEVICES

(75) Inventors: Alexander John Limberis, San Jose, CA (US); Fenglei Du, Fremont, CA (US); David Nathan Blado, Santa Clara, CA (US); Hans Robert Guntren, San Mateo, CA (US)

(73) Assignee: Syabas Technology Inc., Fremont, CA (US)

( * ) Notice: Subject to any disclaimer, the term of this patent is extended or adjusted under 35 U.S.C. 154(b) by 331 days.

(21) Appl. No.: 11/386,163

(22) Filed: Mar. 22, 2006

(65) Prior Publication Data
US 2006/0221190 A1 Oct. 5, 2006

Related U.S. Application Data

(60) Provisional application No. 60/665,336, filed on Mar. 24, 2005, provisional application No. 60/670,969, filed on Apr. 11, 2005.

(51) Int. Cl.
G03B 17/00 (2006.01)
(52) U.S. Cl. .................................................. 396/310
(58) Field of Classification Search ............. 348/211.2, 348/211.3, 231.2, 231.3, 207.1, 207.11; 396/310, 396/429
See application file for complete search history.

(56) References Cited

U.S. PATENT DOCUMENTS

| 6,690,883 | B2 * | 2/2004 | Pelletier | 396/321 |
| 6,965,398 | B2 * | 11/2005 | Arakt | 348/211.3 |
| 7,158,172 | B2 * | 1/2007 | Kawaoka et al. | 348/211.1 |
| 7,403,225 | B2 * | 7/2008 | Singh | 348/231.5 |
| 2004/0174434 | A1 * | 9/2004 | Walker et al. | 348/211.3 |
| 2005/0018057 | A1 * | 1/2005 | Bronstein et al. | 348/239 |
| 2006/0044398 | A1 * | 3/2006 | Foong et al. | 348/207.99 |

OTHER PUBLICATIONS

Sharpcast, Inc., "Ultra-simple, ultra-powerful photo organization and access," http://www.sharpcast.com, 2006, 9 pages.
ShoZu, "Create. Share. Enjoy.," http://www.shozu.com/portal/; 2006, 6 pages.
Yahoo! Go, CEO Terry Semel Introduces Yahoo! Go at the 2006 Consumer Electronics Show in Las Vegas, http://go.connect.yahoo.com/go; 2006, 5 pages.

* cited by examiner

Primary Examiner—W. B. Perkey
(74) Attorney, Agent, or Firm—Woodcock Washburn LLP

(57) ABSTRACT

Personal data services, such as a set of Web services, are enabled that allow a user to enter personal metadata information, e.g., about likely people and/or events to be targets of a camera capture event. Then, when a user's computing device acquires such metadata, e.g., via embedded Web services software, an intelligent user interface allows the user to enter whether any of such personal metadata information pertains to any personal data, such as a video, an audio file or an image, which is captured by the user's computing device. The personal data including the metadata information can be automatically uploaded via one or more wired and/or wireless networks to a device that hosts a personal data service, which stores the personal data and associated metadata, providing for effective means to access and manage a user's personal data store. The services of the invention also enable a system for identifying unknown or new metadata where existing metadata is not sufficient to describe a video, audio or image capture event. In addition, a gateway is provided that enables transfer of content from the Web services to other media service providers, such as a cable or television over Internet Protocol ("TVoIP") video or other video on demand ("VOD") service.

22 Claims, 17 Drawing Sheets

FIG. 3B  User Interface 310b

User Interface 310c

TECHNIQUES FOR TRANSMITTING PERSONAL DATA AND METADATA AMONG COMPUTING DEVICES

CROSS REFERENCE TO RELATED APPLICATIONS

The present application claims priority to U.S. Provisional Appln. No. 60/665,336, filed Mar. 24, 2005, and entitled "System for Personal Video and Still Image Metadata Capture" and to U.S. Provisional Appln. No. 60/670,969, filed Apr. 11, 2005, and entitled "Notification System for Capturing New or Unknown Metadata for Personal Image/Video Metadata Capture System and Alerts."

FIELD OF THE INVENTION

The present invention is directed to techniques for communicating personal data among a plurality of computing devices. More particularly, the present invention is directed to user interfaces, devices, systems, methods and protocols for automatically communicating personal data, such as images, videos, audio, etc., and associated metadata among computing devices.

BACKGROUND OF THE INVENTION

Computing devices of all kinds have made people's lives faster, easier and more inexpensive in some fashion, whether directly or indirectly, for many, many tasks in which people engage in their daily lives. For instance, advancements in software flexibility, processing power and digital storage have made digital cameras commonplace today for their clear benefits over their analog counterparts. While analog cameras still have some advantages to high end photographers, digital cameras have evolved to provide substantially indistinguishable quality for the vast majority of photographs while simultaneously providing many benefits in flexibility.

Digital cameras, for example, enable the recording of a large number of photographs compared to analog cameras. With analog cameras, a user has to buy expensive film limited to a small number of photographs, e.g., 36 photographs, before the film has no more room whereas with digital cameras, in contrast, many photos, e.g., several hundred, may be recorded at a single time. Additionally, the memory of a digital camera is reusable, whereas the user of an analog camera must purchase new film. Other advantages of digital cameras, such as the ability to manipulate images directly in software, also exist over traditional analog cameras. Still further, portable devices of all kinds, including but not limited to portable media players, cell phones, PDAs, now include cameras and associated memory, such that the availability of media content recorded by users has mushroomed in recent times.

However, the scalability of tasks that technology advantageously brings sometimes leads to additional problems due to the very scale that the technology itself enabled. Taking the case of digital cameras, instead of taking a few hundred pictures a year which were dutifully placed in physical albums that take up physical space, now thousands, if not tens of thousands, of photos can easily be taken by an avid user of various devices having digital camera capabilities in a single year. A user cannot expect to develop each one of these photos into a physical copy because the amount of time that would be taken and eventually the amount of 3-D space taken up by the albums would be limiting.

To address this issue, currently, each time a user runs out of room in memory of a digital camera for additional digital photographs, or at any time, the user can transfer the contents of the memory of the digital camera to another computing device, such as a personal computer (PC), gaming system, laptop, handheld device, etc., where the photos can be stored according to the file system of the device (e.g., in folders, in a database, etc.), further manipulated, displayed as a slideshow, or otherwise acted upon by the device. The user may also upload the photos from this other computing device, to the extent it is connected to a wide area network, such as the Internet, to a server hosting a media storage and display service that is communicatively coupled to such wide area network, at which point the user may share such folders to any friends, family, or other third parties who have access to the wide area network.

However, this process is not a good solution to the problem of scale that digital cameras have introduced for several reasons. For one, the process is more complex from a technological standpoint than many users are equipped to handle. This is true for both offloading media from a portable device, such as a camera, to a transferee computing device and for uploading the content from the transferee computing device to a server. For instance, the offloading task may involve understanding the mode in which the camera needs to be, possessing an appropriate cable and corresponding understanding of where the interfaces of the cable are received by the transferor portable device and transferee computing device in order to achieve a proper download, and finally an understanding of software on the transferee computing device, which may require a pre-configuration to be able to connect to the particular transferor portable device, that is not always entirely intuitive to a computer novice in order to initiate the offload. The uploading task can also be challenging to achieve for an infrequent user of a computer. For instance, it requires navigation and log-in to a web site, sometimes requires a download of extra software to work, and requires the user, at a minimum, to have an understanding of how to find the data on the computer.

Additionally, these steps take significant time away from the user when the user could be performing more important tasks. An offload of a hundred still images from a camera, for instance, may require five to ten minutes, or more, to complete. Depending on the connection to the Internet, an upload to a server of a hundred still images may take even longer. In short, once a user has completed the task of creating media content, the user should be freed from the current pain caused by administration and overhead surrounding access to such media content.

Moreover, due to the sheer number of photos, videos, audio clips, songs, and the like that a user may store on a computer in different locations and folders, personal data management and search has grown out of control. Due to the scale of the problem, much like finding a needle in a haystack, it may be very difficult for a user to find a particular media item in his or her personal data store. While some file systems and services allow a user to manually enter and attach metadata to a media item, again due to scale, adding metadata per media item is more trouble to the user than it is worth.

Accordingly, for these and other reasons, improved methods for transmitting personal data, such as media content including video, images and audio files, among computing devices, and for automatically assigning metadata to the personal data are desired.

SUMMARY OF THE INVENTION

In various embodiments, the invention enables a service, such as a set of Web. services, that allows a user to enter personal metadata information, e.g., about likely people and/or events to be targets of a camera operation of any of the user's computing devices. Then, when a user's computing device acquires such metadata, e.g., via embedded Web services software, an intelligent user interface allows the user to enter whether any of such personal metadata information pertains to any personal data, such as a video, an audio file, or an image, which is captured by the user's computing device. The personal data including personal metadata information can be automatically uploaded via one or more wired and/or wireless networks to a device that hosts a personal data service, which stores the personal data and associated metadata, providing for effective means to access and manage a user's personal data store. The services of the invention also enable a system for identifying unknown or new metadata where existing metadata is not sufficient to describe a video, audio or image capture event. In addition, a gateway is provided that enables transfer of content from the Web services to other media service providers, such as a cable or television over Internet Protocol ("TVoIP") video or other video on demand ("VOD") service.

Additional features of the invention are described in more detail below.

BRIEF DESCRIPTION OF THE DRAWINGS

The system and methods for transmitting personal data and metadata among computing devices in accordance with the invention are further described with reference to the accompanying drawings in which:

FIGS. 3A, 3B, 3C, 3D, 3E and 3F illustrate exemplary, non-limiting embodiments of user interfaces in accordance with user interaction with a client device in accordance with the invention;

DETAILED DESCRIPTION OF ILLUSTRATIVE EMBODIMENTS

Figure 1:
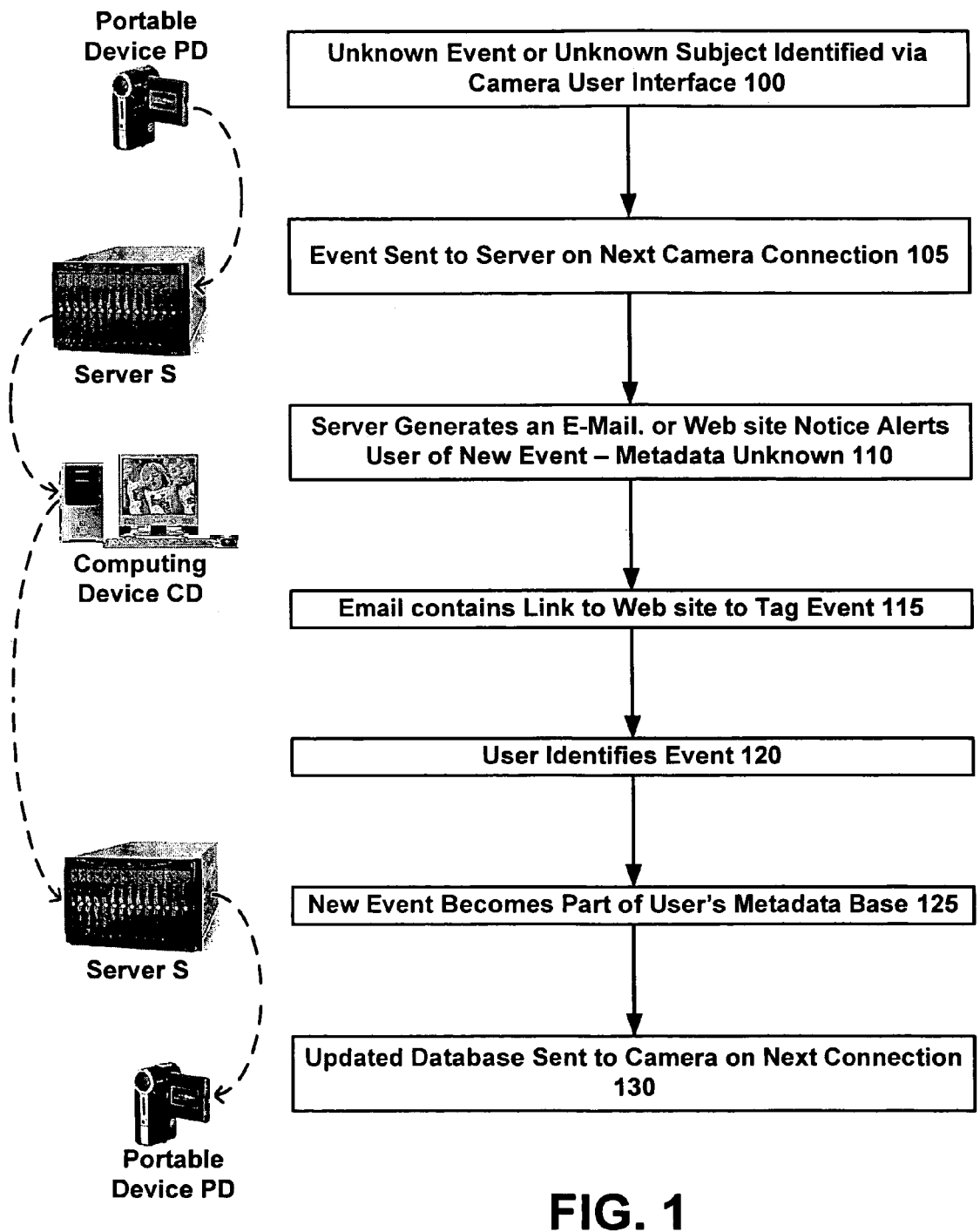
FIG. 1 illustrates an exemplary flow diagram for generating new metadata for an unknown capture event in accordance with personal data services in accordance with the invention.

As described in the background, the state of today's interaction with camera devices of various sorts is painful due to the complexity and time consumption necessary to achieve transfer and upload of media files, such as photos, videos, audio files, etc., to a common location. Additionally, organization and the ability to search personal data effectively, and to access and render such data at will, can not easily be achieved today due to the time consumption that is necessary to categorize such media files by hand, and the lack of a common generalized architecture for rendering such personal data to the user.

In consideration of such shortcomings, the invention enables a service that allows a user to enter personal metadata information, e.g., about likely people and/or events to be targets of a camera operation of any of the user's computing devices. Then, when a user's computing device having camera capabilities acquires such metadata, e.g., via embedded Web services software, when personal data, such as a video, an audio file or an image, is captured, an intelligent user interface allows the user to enter whether any personal metadata information pertains to the capture, which is automatically stored with the capture.

In addition, if during the capture and tagging process, a new unknown event such as a new subject, new location or new event is captured that is not satisfied by existing personal metadata information for the user, the user can tag the event directly as unknown. Then, after the device connects, e.g., via Web services, the unknown event is distributed to the user's account, or e-mail, allowing the user to easily tag the unknown event. This new unknown event is then known and added to the user's metadata database and, in turn, can be downloaded to the user's camera for use in the future.

The personal data including personal metadata information can then be automatically uploaded via one or more wired and/or wireless networks to a service, which stores the personal data and associated metadata, providing for effective means to manage a user's personal data store on-line. For instance, after capture, a video (or image stills, and/or audio) and collected metadata about the video can be trickle uploaded to a server via Web services whenever the digital camera device acquires an IP address (for some non-limiting examples, wherever there is a WiFi connection, a USB connection or other connection to a networked computer), to free the user from the pain of local memory exhaustion of the digital camera, or otherwise transfer the capture data via a direct and/or indirect networked connection. As a result, all of the user's content can be automatically stored, catalogued and sharable from the server, e.g., from a set top box, from a PC, from a cell phone, or any computing device supporting the services (e.g., Web services) provided by the invention.

It is important to note that the services of the invention may be hosted by any number of computing devices having sufficient processing and storage capabilities to host the personal data services described herein and to achieve the aggregation of personal data in accordance with the invention. In this respect, any "server" described herein may include multiple server computers, and a server is defined herein as "any computing device(s) that operate to host the personal data services" described herein. For instance, distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit an entire enterprise. In this regard, the services of the invention may thus be implemented in a distributed system, in a peer to peer architecture, and in hybrid architectures. The services of the invention may also be hosted in a home network, wherein a standalone PC acts as the server for a set of devices in the home. Accordingly, while the term server as utilized herein includes a traditional, or standalone networked "server" device, the term shall not be considered limited thereto.

In various embodiments described herein, the invention includes at least three main pieces or components to the system: a digital video (or still image) camera ("DVC"), a video/still image Web service, and a gateway that enables transfer of content from the Web services to either a Cable or TVoIP video or other video on demand service.

In one embodiment of the invention, a portable device having image capture capabilities, such as a digital video camera ("DVC"), includes an embedded client software stack that interoperates with personal data services in accordance with the invention.

In one embodiment, prior to use, the DVC is preloaded with a set of preset metadata tags. These metadata categories include a broad set of default life events in connection with which the average consumer might use the camera enabled device to capture events as either digital stills or digital videos. For example, such metadata tags might include "First Child," "Second Child," "Birthday," "Anniversary," "Christmas," or other holidays popular in the locale of purchase, etc. The default metadata can be used even if the camera has never connected to the Web services.

When the camera enabled device connects to the personal data services of the invention, either tethered via a PC or un-tethered via a direct connection, the device operates as follows in one embodiment. First, when the user instantiates operation of a camera enabled device, after a period of time, e.g., a day, the camera prompts for the event that is being or was recorded, giving the user an opportunity to assign one or more event metadata tags to the event. Then, this event metadata tag is stored with the image data for use with the view services of the invention. Then, once a user's credentials are authenticated for use with a Web service provided by the invention, a customer can further download metadata entered at the Web service that is specific to, or tailored by, the customer, and the customer can upload any video data on the camera to the Web service, either automatically when capable, or according to settings which determine when upload should occur.

In various embodiments of the Web services of the invention, when the user first signs up for the Web service, the service asks the user to identify key aspects in their lives, for example, the names of their children, their birthdays, parents names, anniversary dates, etc. This information is used for several purposes.

For instance, the Web services of the invention can download the metadata to any of the user's camera enabled devices. A camera enabled device, as described above, is tied to the Web service via login credentials. Thus, when a camera enabled device first connects to the Web service, the camera enabled device can download the names and attributes of each of the metadata objects into the camera enabled device. This creates a richer, more customized, experience for the user. Instead of the user of the camera enabled device being presented only with the option for a birthday of their first child, the camera enabled device will know about the user's family, and thus the user will be able to select "Billy's" or "Birthday," or "Billy+Birthday." Additionally, the camera enabled device includes intelligence to offer intelligent guesses as to what event is being recorded. For instance, where the camera enabled device knows the date and time, the camera enabled device will know that the event being recorded is around Billy's birthday and will therefore be able to suggest that the event is Billy's birthday, along with other probable events. The same will happen for other common events such as wedding anniversaries, and various events associated with brothers, sisters, parents, etc.

When the user records events of their lives, the user can select the metadata object(s) to be recorded with the video, still image, or audio data. Thus, when the camera enabled device connects to the Web service, it uploads this information along with the video, still image and/or audio information.

The metadata can also be used for indexing and cataloging of recorded events. Thus, in another aspect of the invention, the Web service uses the metadata object(s) captured from the camera enabled device to index the video for later viewing ease. When a user logs into the Web services, for instance, the user is associated with the community according to setup as the owner of the source data. They thus will see sorted recordings captured by them and be able to select them.

In addition to seeing the recordings sorted by events, the invention enables the user also to see them sorted by source user. One viewer may be members of multiple source communities. For example, if the user is a grandparent, the grandparent is enabled by their Web service credentials to see content posted by more than one of their children who have posted events for their children, and enabled grandparent access to the data.

It also should be noted that what is outlined above regarding a Web service providing the information to camera enabled device could just as easily be done directly on a local PC. Thus, for example, rather than a user entering the information on the Web service and having that information downloaded to the camera enabled device, a local PC application can gather and send this information to the camera enabled device directly, e.g., via USB or Bluetooth connection. Instead of the camera enabled device being required to connect to the Internet to download and upload the information, the camera enabled device achieves the same information exchange when connected locally to the PC via USB, FireWire (1394), WIFI, or any other networking interface known to those of skill in the art.

In addition, the Web services of the invention enable a system for identifying unknown or new metadata where existing metadata is not sufficient to describe a video, audio or image capture event. In this regard, the invention includes a system for easy generation of previously unknown events, subjects or places.

In this regard, when the user of the camera enabled device captures a new event, subject or place that is not already catalogued, he or she is presented with a menu system for tagging the content, as described above. For example, if the user were to capture a new subject, e.g., Uncle Tom, and Uncle Tom had never been entered into the user's metadata database, one of the options on the camera enabled device's menu would be to select "new subject," or a similar designation. Then, when the camera enabled device connects to the Web service, or if already connected, the camera enabled device can upload the video, audio or image along with any existing metadata and along with any "new subject" or "new event" designations by the user.

As a result, the service can also generate an event to the user via e-mail, or as a notification on the user's home account via a Web site, that an unknown event was recorded. This will include information about the event such as the date and time, the unknown event number and a pointer to the uploaded video, audio or image, and/or some or all of the image data to remind the user that the event is untagged. The user is then presented with a Web form that enables them to add the metadata for the unknown event, subject or place. This new information is then included in the user's metadata database, i.e., the store that records all of the metadata associated with that user, and can be downloaded to any of the user's camera enabled devices just as in the case that any other metadata is added.

As described above, default events that are stored in the camera enabled device may also generate notifications for metadata generation. For example, if the user first purchased the camera enabled device, and first child was never identified the first time first child is used as a tag, the system can generate an event so that the user will then update the metadata fields associated with the first child. In this fashion, the metadata associated with a user becomes richer and more personal to the user over time, and thus more helpful to the user.

As described herein, certain exemplary embodiments or methods may describe the processing of images, or audio files (the user's own voice, or a song, for instance), or a video (temporally related image data, optionally including audio), or a combination of any of the foregoing; however, for the avoidance of doubt, the invention is considered to apply to any permutation or combination of image data, audio data, and/or video data. Accordingly, any of the embodiments that are described herein in a more narrow context, where applicable, are to be considered to be applicable to any of image, audio and/or video files.

In one aspect, the invention thus provides metadata synchronization for camera enabled devices. As shown in FIG. 1 in exemplary fashion in the flow diagram, which also shows an exemplary communications flow from a camera enabled portable device PD, to a server S, to a networked computing device CD, back to server S and once again to portable device PD in parallel to the flow diagram, at 100, an unknown subject or unknown event is captured as part of a video, audio or image capture by portable device PD. At 105, anytime the camera enabled device PD connects to the service via server S, the unknown event or unknown subject identified as such is transmitted to server S. At 110, in response to the unknown designation, the server provides a notification to the user, e.g., an email with a link, or a notice via a home account page, that an event has unknown metadata associated with it. At 115, via a computing device CD, the user receives the notification, e.g., by email or via Web site notice, indicating that the event has unknown metadata. At 120, the user identifies the event, e.g., via an appropriate Web form or the like, and as a result, at 125, the metadata so entered is stored in the server S with which the user of computing device CD interacts along with the rest of the user's metadata. Finally, at 130, the metadata in the updated database is sent to the camera on the next connection, e.g., as a delta file that indicates to portable device PD what has changed about the metadata from a synchronization standpoint, e.g., using techniques similar to email synchronization with an email server.

In addition to uploading any new recorded images, audio files or videos along with captured metadata from capture device, the invention can also be configured to also download the latest metadata to the capture device as currently stored on the Web service or local PC at or about the same time.

Another function that may be included in various embodiments of the systems and methods of the invention includes taking the metadata information that is tagged on the camera enabled device and when it is uploaded to the server, performing image recognition on the data (e.g., image frames from a video, or still images) to help recognize subjects in the image and automatically tag the data. For instance, taking all images tagged "Billy—First Child," the software can automatically form an image recognition basis for automatically tagging images with Billy in the images.

For example, imagine a user captures a video using a digital video camera. Using the metadata capture technology in accordance with the invention, the camera enabled device guesses it is probably Billy's birthday. After the video is uploaded to the service, the servers in the background can automatically locate video clips that include Billy, and store them separately or otherwise enhance or indicate the locations that implicate Billy, filling in gaps where Billy is not appropriately identified across a user's personal data. This can be particularly useful for a user who may begin using the services of the invention after beginning with thousands of untagged images. After the system learns what Billy's facial features look like, the software on the server can go back and add "Billy" tags to a substantial number of untagged images to effectively integrate older images and videos into the user's personal data store.

Also, when a user view his or her personal content stored on the servers from a networked client device, using a UI that is provided in accordance with the invention, the user can identify who the subjects are, and they can directly identify Billy. This way, the image database can remain fresh for image recognition purposes in that many subjects are people whose images likely change over time, e.g., as they age, change hairstyles, etc.

A host of other advantages are achieved by having a sporadic connection between the camera enabled device and either the service or a viewing client, such as a PC, as connections come and go. For example, the camera enabled device and the camera enabled device's components, such as the integrated circuit (IC) video encoder, can be automatically identified as part of the connection. Then, certain features can be enabled based on the characteristics of the particular camera enabled device and associated ICs in the camera enabled device. For example, if the particular camera enabled device or IC has a known flaw in its encoding, the encoding can be corrected prior to storage via the service or viewing via the PC.

In addition to image and video technologies, it is also possible in optional embodiments of the invention to have the metadata spoken into the camera enabled device, whereby the audio recording of the words, as part of audio metadata associated with the capture event, is uploaded to the service of the invention. The more enhanced processing power of the service, or a PC application, can then be used to parse through the audio and convert speech into metadata tags for later sorting and cataloguing. For instance, the speech can be compared against a pre-recording of the user speaking each of the existing metadata tags into a microphone for the service of the invention to use as an aid in the later task of mapping speech to metadata tags.

When a user has an account for the Web services of the invention, the user can also enter data about those who are authorized to use the service, for example, the user's parents, siblings, other extended family, friends and neighbors. This information is downloaded to the camera enabled device whenever the camera enabled device and the Web service connect, so that appropriate user authentications can occur as part of connecting.

In another aspect of the invention, the Web service can deliver personal data to a set top box (STB). Today, many people receive their broadcast channels and other premium channels via cable, satellite and coming distribution over digital subscriber lines (DSL). Accordingly, the invention also contemplates several implementations and embodiments depending on the type of STB being deployed by the user. For instance, in an embodiment of digital cable with video on demand (VOD) capabilities, such as cable systems that use the existing MPEG-2 video infrastructure, the system of the invention offers a seamless way to access the consumer generated content based on the metadata that was generated in the camera enabled device by delivering the content on demand by the user.

In various other embodiments of the invention, whenever the digital camera device is connected to a host system or server via a wireless connection, the Web service automatically lifts video content taken from a digital camera device, and trickle uploads the video content to servers provided in accordance with the invention, i.e., the task of uploading capture events and associated metadata to the service of the invention can be performed in a way that is not intrusive to the use of the device itself, e.g., by trickle uploading, uploading as a background task, uploading after 2 a.m., etc.

A common, but nonetheless exemplary and non-limiting, use scenario for the invention is as follows:

First, a user enters information about likely people and/or events to be video targets at a Web site hosting a user's personal data, such as images, audio files or videos. Then, a digital camera device owned by the user acquires such metadata via embedded Web services software when the digital camera device becomes connected to the Web service, so that when video, audio or images are acquired by the camera device, a user interface (UI) asks whether any one of the likely people and/or events is in fact the target, giving the user an easy chance to tag the capture event with applicable metadata.

Next, after the capture event, the video and collected metadata about the video are transmitted, e.g., trickle uploaded, to the server via Web services whenever the digital camera device acquires an IP address (e.g., wherever there is a WiFi connection, USB, FireWire, or other connection to a networked computer), to free the user from the pain of local memory exhaustion of the digital camera. Finally, all of the user's content is thus automatically stored, catalogued and sharable from the server as a result, and viewable via any networked client device. The metadata enriches the viewing experience because more relevant images and/or video can be retrieved by the user. In essence, the metadata tags operate as intelligent filter mechanisms that are relevant to the user for retrieving, viewing, organizing and sharing the personal data.

Figure 2A:
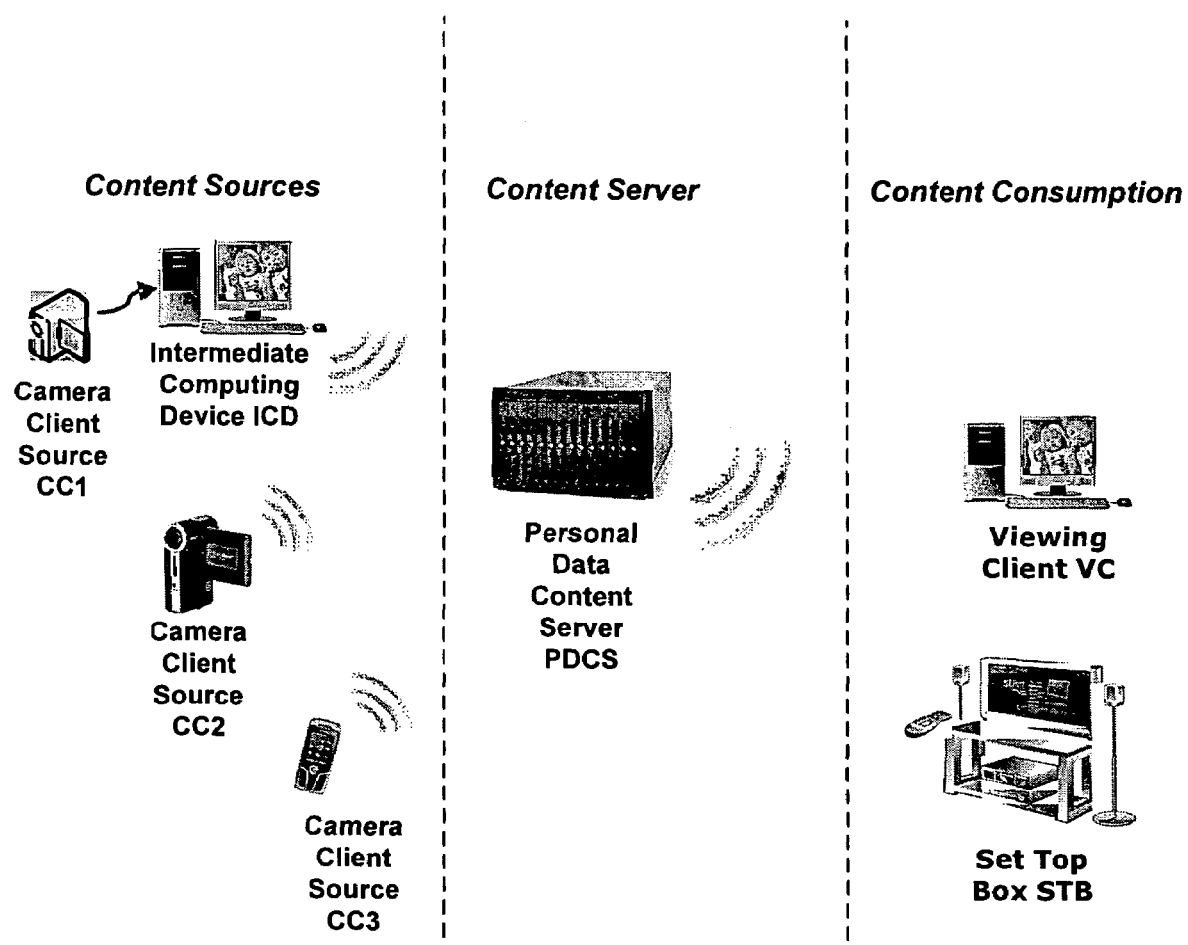
FIGS. 2A and 2B illustrate exemplary aspects of the operation of the personal data services enabled by the invention.
Figure 2B:
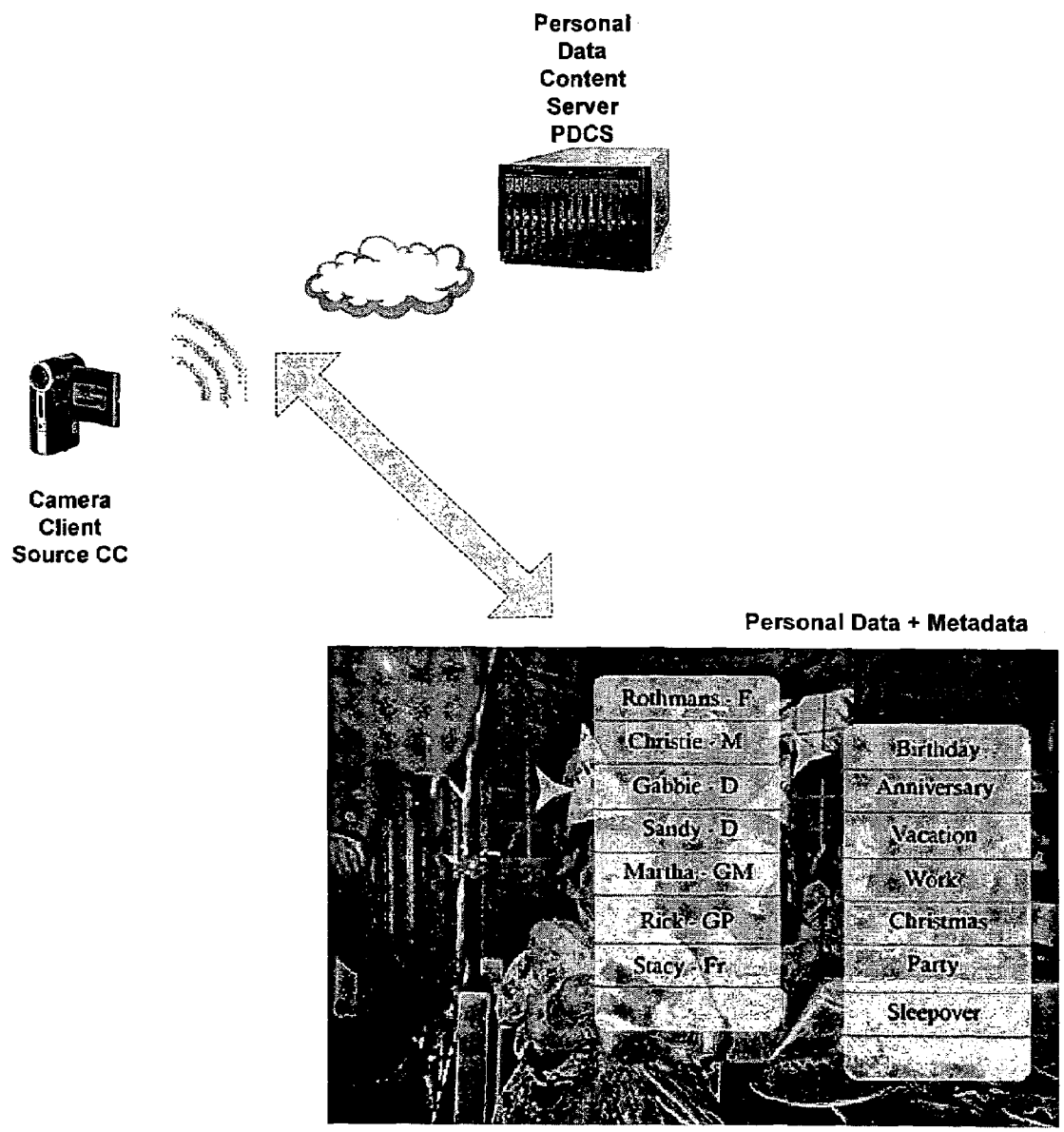

FIGS. 2A and 2B illustrate exemplary interaction from capture to Web service (or local computing device) to other network access or consumption of data captured and indexed by the Web service of the invention. FIG. 2A illustrates three conceptual zones where personal data interaction takes place. On the left side are illustrated the content sources, which include clients that have embedded Web services software for interacting with the Web services of the invention. The Web services software enables, from the user's perspective, "magic-like" transfer of personal content from a camera enabled device to a Web service for consumption and sharing in by family and friends. The content sources include both camera client sources such as clients CC1, CC2 and CC3, which may be capable of transmitting personal data recorded with the camera client source directly to the servers hosting the services of the invention via known wireless and/or wired means, e.g., cellular networks. The content sources also include intermediate computing devices, such as device ICD, which has received content as offloaded from a camera client source, such as client CC1. Device ICD thus serves as an intermediary as it then can transmit the personal content to the servers via known networking means, e.g., the Internet.

In this fashion, as described above, personal content recorded from a plurality of camera enabled devices can be tagged with relevant metadata tags (or tagged for later entry of metadata where no relevant metadata tags yet exist to describe the data) via an intelligent UI, and then transmitted to a common storage location at the servers, such as personal data content server PFCS in the center zone of FIG. 2A. Mainly, personal data content server PDCS serves to centrally and securely store a user's account data, personal data such as images, audio files or videos and associated metadata, and a user's evolving set of metadata tags to describe capture events relevant to that user. The current set of metadata tags can be transmitted to the content sources at any time when a connection is made, or when a content source requests a synchronization of the metadata tags.

Having all of the user's personal data in one location enables rich scenarios as augmented by the associated metadata; however, this also exposes a user's data to risk. Accordingly, personal data stores can be subject to known backup and encryption techniques to help protect a user's data from corruption and to prevent third parties from gaining unauthorized entry to the data. Such rich scenarios are illustrated on the content consumption zone illustrated on the right side of FIG. 2A wherein a networked computing device is illustrated as a viewing client VC for viewing slideshows relating to son "Billy," as reflected by metadata tags, or for organizing the personal data, or for authorizing access to third parties for viewing one or more subsets of personal data. In one embodiment, the invention enables personal data such as videos stored on the personal data content server PDCS to be transmitted to a set top box STB, e.g., via TVoIP protocols, or otherwise displayed on screen via existing media remoting technologies.

FIG. 2C illustrates a high level view of the interaction between a server PDCS and a camera enabled device CC, and how personal data coupled with useful and easily enterable metadata is advantageous. On the camera client source CC side, an intelligent UI is provided to the user in order to easily enter metadata that may be relevant to a current or previous capture event. For instance, the intelligent UI, based on date and time information, or other clues, can present a list of metadata tags believed to pertain to an image capture event. The user can then easily and quickly select, or unselected, relevant metadata tags that apply to the image. Then, those metadata tags are bound to the associated capture data so that such metadata can be leveraged for viewing operations. The data is then aggregated at personal data content store PDCS so that all of a user's personal content along with associated metadata, no matter where taken or on what device, can be accessed together. In addition, as described above, a mechanism is provided in accordance with the invention via unknown capture event tagging that enables the set of metadata that applies best for an individual user to evolve over time to better describe the user's typical capture targets. The invention thus enables a holistic ecosystem for personal data, integrating servers and cameras, enabling rich demographic metadata to be easily entered and used utilizing advanced user friendly features and connectivity, as well as metadata driven image recognition.

In many of the exemplary embodiments described herein, the services of the invention are contemplated as being achieved via a Web services framework, though as described above, the invention also contemplates a computing device, such as a local PC, with a local connection to the camera enabled device with viewing performed on the computing device, i.e., the invention may be performed as a standalone application or service executing on a computing device or as a Web service in the manner described above.

As mentioned, in one embodiment, the connectivity is designed not to require a constant network connection, since often camera enabled devices are off-line or too remote to establish a connection, but rather intermittent connectivity can be used to trickle upload personal data as network availability comes and goes. Trickle upload enables the client/server negotiation to continue synchronizing content over a variety of connection types, since the protocol and processes for handling the trickle upload of a user's personal data is independent of means of transport.

Portable device clients with camera functionality may include software in accordance with the invention, designed to run on a variety of mobile platforms, in order to (A) establish a wireless link between each mobile device and a centralized personal content media server, (B) to allow users to intelligently tag media (media can be defined in any known format of photo and video) with applicable keywords and/or (C) allow users to define transfer settings and destination(s) for their media.

Portable device clients of the invention include a User Interface and media tagging functionality, described below in more detail. Some activities that may be performed during setup and use of a portable device client in accordance with the invention are also noted below.

As mentioned, a portable device client in accordance with the invention is designed to operate on a wide range of diverse platforms. In one non-limiting embodiment, the list of devices includes all platforms capable of (1) capturing media and (2) connecting to an IP enabled network, including but not limited to personal digital assistants (PDAs), camera phones and wireless enabled digital cameras. As many of the eligible platforms may be capable of providing only a subset of typical user interaction and control functionality, the way in which the services of the invention are instantiated will vary across the spectrum of devices. In this respect, the user interface and media tagging functionality, and setup techniques can be optimized for each new supported device and/or platform.

In one embodiment, the user interface of a portable device client that is associated with personal data services in accordance with the invention is accessible via a single menu, e.g., a list, of options. In some devices, more advanced features may be hidden unless otherwise requested by the user. In other devices, advanced features can be removed altogether, e.g., if they are not supported by the device.

In one non-limiting implementation, a basic feature set for a client source includes the following items: Personal Data Settings and Media Destination(s). Personal Data Settings allows the user to enter authentication settings and media transfer settings. Media Destination(s) allows the user to choose from a predefined list of media folders of the service and/or to create a new media folder of the service to which subsequent media files should be delivered (e.g., to a particular album, or family member folder, etc.).

Figure 3A:
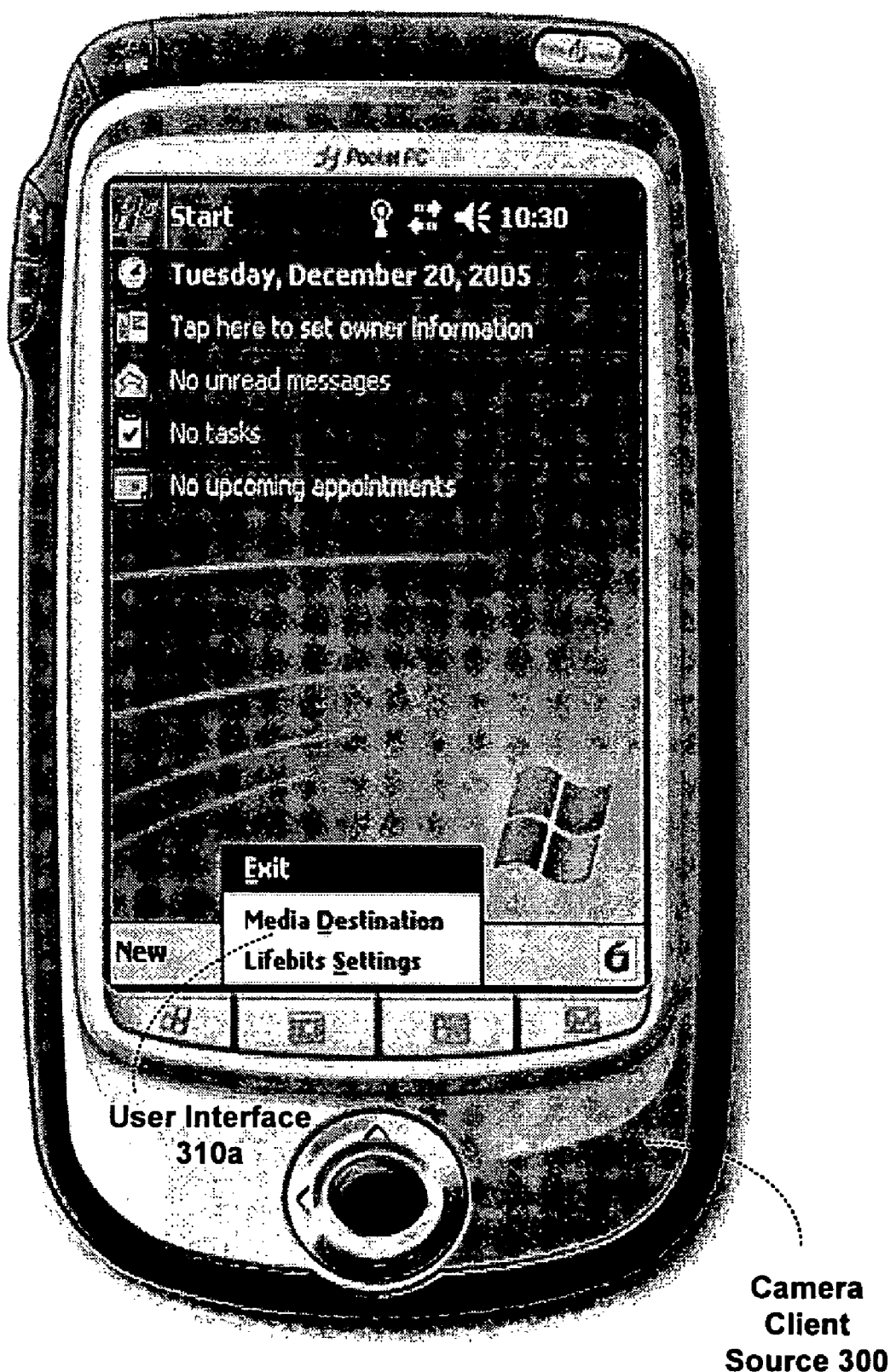

FIG. 3A illustrates an exemplary implementation of a user interface menu 310a on an exemplary, non-limiting camera client source 300, which includes an exemplary list of basic functionality. As shown, the user interface menu 310a includes options to "Exit," access "Media Destinations" or access Personal Data Settings referred to as "Lifebits Settings." Media Destinations and Personal Data Settings are described above. FIG. 3B shows a user interface menu 310b showing additional functionality "Transfer to Lifebits" and "Lifebits Service Status." "Transfer to Lifebits" initiates the transfer of some or all personal data recorded on the device, as designated by the user. In a default embodiment, any personal data on the device that has not been previously transmitted to the personal data service is transmitted. "Lifebits Service Status" gives the user an indication of connectivity to the personal data services enabled by the invention. Where used, Lifebits or Lifebits services referred to herein are utilized in designation of an exemplary, non-limiting embodiment or implementation of the personal data services enabled by the invention, as described elsewhere herein.

Figure 3C:
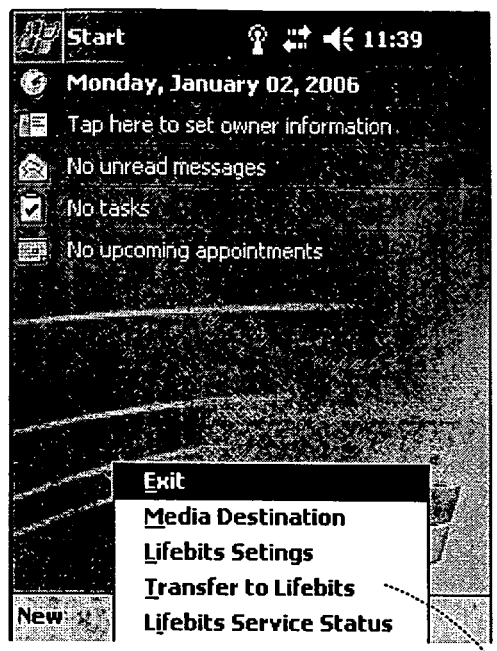
Figure 3C:
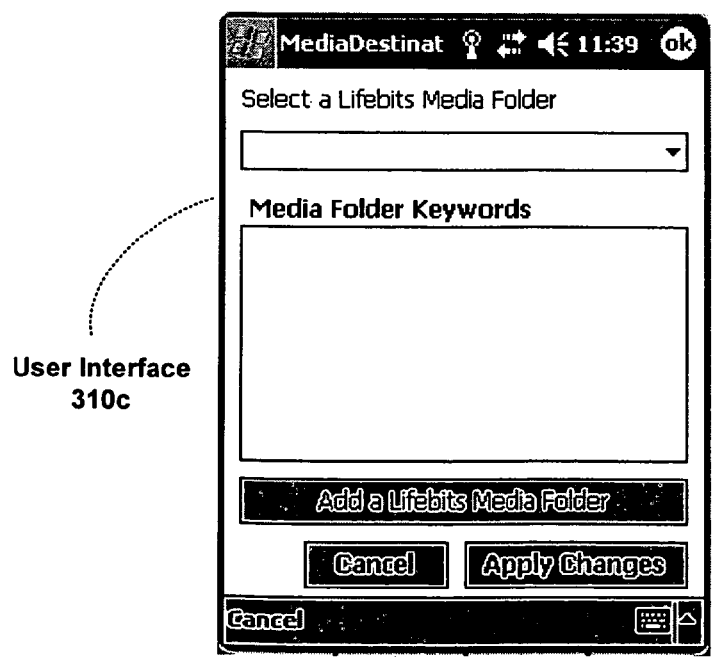

FIG. 3C illustrates an exemplary implementation of a user interface menu 310c that results as a result of invoking the "Media Destinations" option, showing that a user can select an existing media folder, e.g., via a dropdown control, can modify and view keywords associated with media folders, create a new media folder, cancel the "Media Destinations" option, or apply any changes made to the keywords or media folders.

Figure 3D:
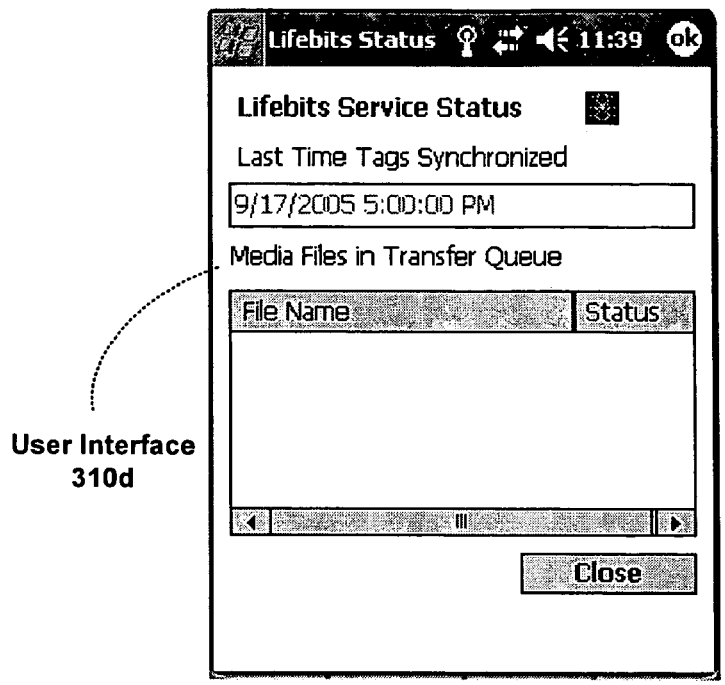

FIG. 3D illustrates an exemplary implementation of a user interface menu 310d that results as a result of invoking the "Lifebits Service Status" option, showing various segments of information pertaining to the operation of the personal data services enabled by the invention. The user interface menu 310d illustrates that a user may be presented with information telling the user when the last synchronization with the personal data servers of the invention was (e.g., date and time information). Additionally, the user may be presented with a list of media files in a transfer queue, awaiting upload to the personal data servers. In essence, the user may be presented with a host of information related to the operation of the personal data services, including whether any new metadata tags have been acquired, and or which have recently been used for capture events.

Figure 3E:
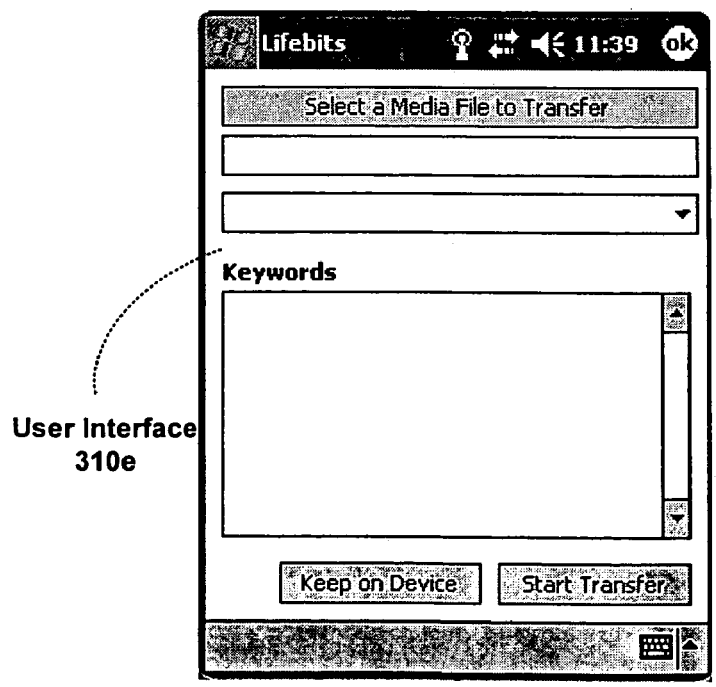

FIG. 3E illustrates an exemplary implementation of a user interface menu 310e that results as a result of invoking the "Transfer to Lifebits" option, showing that a user can designate content, such as media files recorded by the device, to transfer to the personal data servers of the invention. Files can be designated for transfer, or non-transfer (i.e., keep on device), and media files can be selected explicitly or via a drop down list. Keywords for a current media file can be displayed when making the decision to transfer the media file to the personal data servers of the invention or not. Once the user has finished designating the media files, the user can explicitly initiate a transfer via a Start Transfer control.

Figure 3F:
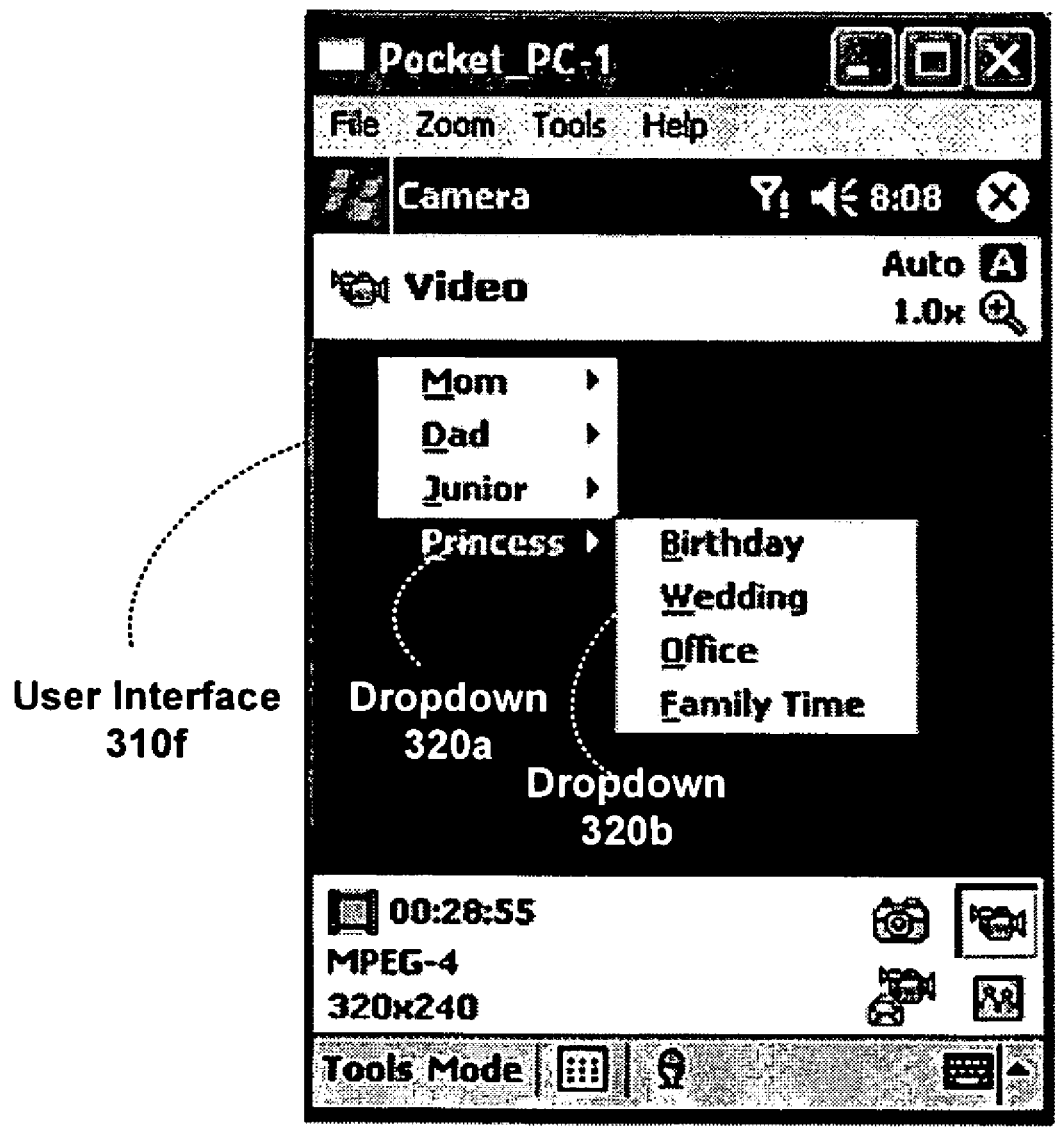

FIG. 3F illustrates an exemplary implementation of a user interface menu 310f that results from completing a capture event in order to apply tags to the capture target data. In this regard, as described earlier, a set of tags that are likely to apply to the data may be presented to the user via a series of dropdowns, such as dropdown 320a and 320b, on a user interface screen 310f. The metadata tags for the video, audio or image capture can thus be assigned to media file immediately, but without difficulty for the user.

The Media Destinations option, as mentioned, allows a user to designate new or existing folders, and view or modify associated keywords with those folders. Thus, when device synchronization occurs in accordance with the invention, media folders can be updated from the database and the device can receive status from the personal data services of the invention. In one exemplary, non-limiting implementation, media folder updating and service status requests can be achieved through use of the following non-limiting XML data structures:

Exemplary Non-limiting XML Definition for Media Folders:

```
<LifebitsUserDescriptor>
<username>USERNAME</username>
<userid>USERID</userid>
<mediafolder>
<foldername>FOLDERTITLE</foldername>
<folderid>FOLDERID</folderid>
</mediafolder>
<mediafolder>
<foldername>FOLDERTITLE</foldername>
<folderid>FOLDERID</folderid>
</mediafolder>
<mediafolder>
<foldername>FOLDERTITLE</foldername>
<folderid>FOLDERID</folderid>
</mediafolder>
</LifebitsUserDescriptor>
```

Exemplary Non-limiting XML Definition for Personal Data Service Status:

```
<LifebitsServiceStatus>
<time>DATE</time>
<newuserdescriptor>YES/NO</newuserdescriptor>
</LifebitsServiceStatus>
```

An exemplary set of advanced features that may be embedded into a camera enabled client in accordance with the invention may include any one or more of the following: Custom Keyword Entry, Artificial Tagging Intelligence, Location Capture (e.g., using global positioning satellites, or GPS, techniques), Software Updater, Mobile Device Media Downloads, Media Sharing Options and Additional Connectivity Settings.

For instance, with Location Capture data, e.g., using GPS data or triangulation techniques, attached to media items where captured, the metadata displayed to a user can be tailored to the location where the media item was captured, e.g., as geographical metadata that applies to the media item. For instance, if the user is at $42^{nd}$ and Broadway in New York City on December 31, the invention could automatically suggest metadata pertaining to New York City, Times Square, or the Big Apple. For another example, if it can be determined via location determination techniques, that a photograph was taken at Safeco Field, metadata such as "baseball" and "Seattle Mariners" can be automatically displayed to the user for assigning to the media items in accordance with the invention. In addition, by factoring in the time and data information, it can be determined that the Seattle Mariners were playing the "Boston Red Sox" based on consultation of a baseball schedule. Accordingly, metadata related to the "Boston Red Sox" can also be displayed. Thus, knowing the location of a camera enabled device and corresponding capture times and dates can help the services of the invention suggest intelligent metadata that applies to the media items captured by the device.

The "Custom Keyword Entry" menu option allows a user to manually enter event specific keywords for each new media file. Due to the complexity of the information entered, a device preferably includes support for text entry on the mobile device.

By invoking the "Artificial Tagging Intelligence" menu option, in addition to providing a list of previously used keywords and allowing users to enter custom keywords, the camera enabled client may also provide "Keyword Suggestions," which may utilize any of a variety of image processing algorithms and artificial intelligence or other machine learning techniques to suggest possible keywords to a user. The Artificial Intelligence technique(s) may consider and incorporate facts from any one or more of the following non-exhaustive list of sources: Past Keywords, Past Media Capture Dates, Past Media Capture Times, Past Media Capture Locations, Account Information (Family Members, Important Dates, Addresses), Current Date, Current Time, Current Location and/or any Additional Sources tending to have a logical relation to the underlying capture subject or event. For the avoidance of doubt, user account information includes, but is not limited to, family member information for a user, important date information for a user or address information for a user. "Keyword Suggestions" thus enhance the user's ability to add relevant metadata to newly captured media files, thereby streamlining the "tagging" process for improved ease-of-use.

The Location Capture (e.g., GPS) option is one for GPS enabled devices, whereby the camera enabled client may capture and save location data (i.e., coordinates) for individual media files. The GPS location data can then be used to provide users with an added means of searching, sorting, and filtering their media collection while using a viewing client. The Software Updater allows the personal data servers and services to provide software updates for its camera enabled clients. The Mobile Device Media Downloads option allows select camera enabled clients to navigate and view existing media files from the media server. The Media Sharing options allow the user to share newly captured media file(s) with others without requiring intervening use of a network enabled viewing client, such as a PC connected to the Internet. Additional Connectivity Settings may include all device specific connectivity settings and functionality.

Figure 4A:
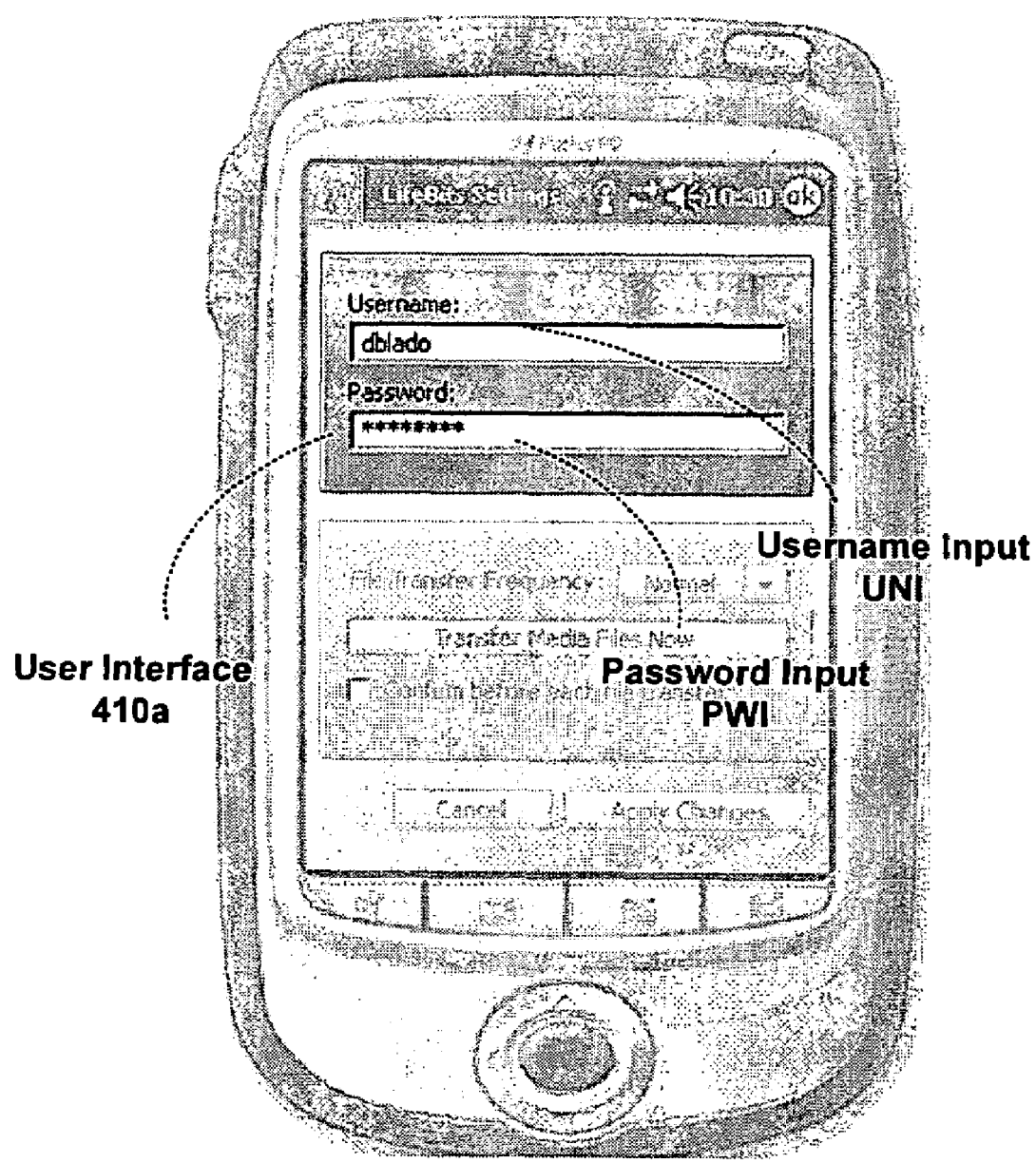
FIGS. 4A, 4B and 4C illustrate exemplary, non-limiting embodiments of user interfaces in accordance with user authentication processes that may take place in connection with the personal data services enabled by the invention.

With respect to user authentication, two standard form inputs are provided on user interface of the camera enabled client. The standard Username input UNI and Password input PWI are located within "Settings" in one non-limiting embodiment, and are shown in the exemplary non-limiting user interface 410a of FIG. 4A. The user interface 410a of FIG. 4A thus allows a user to enter Username input UNI and Password input PWI for purposes of authenticating the user of the device to connect to the personal data services of the invention in an authorized manner. It can be appreciated that form entry for user authentication purposes typically relies on the specific text input mechanisms that may be independently available for each device platform.

A camera enabled client uses the same credentials that are used when a user logs into his or her Web account via a networked connected viewing client. These credentials are established as part of the account creation process from within a Web site hosted by servers of the invention. Users may elect to have the camera enabled client login automatically at startup, or upon explicit login by the user. The former feature allows users to benefit from the personal data services of the invention with little or no interaction with the device after initial setup.

Figure 4B:
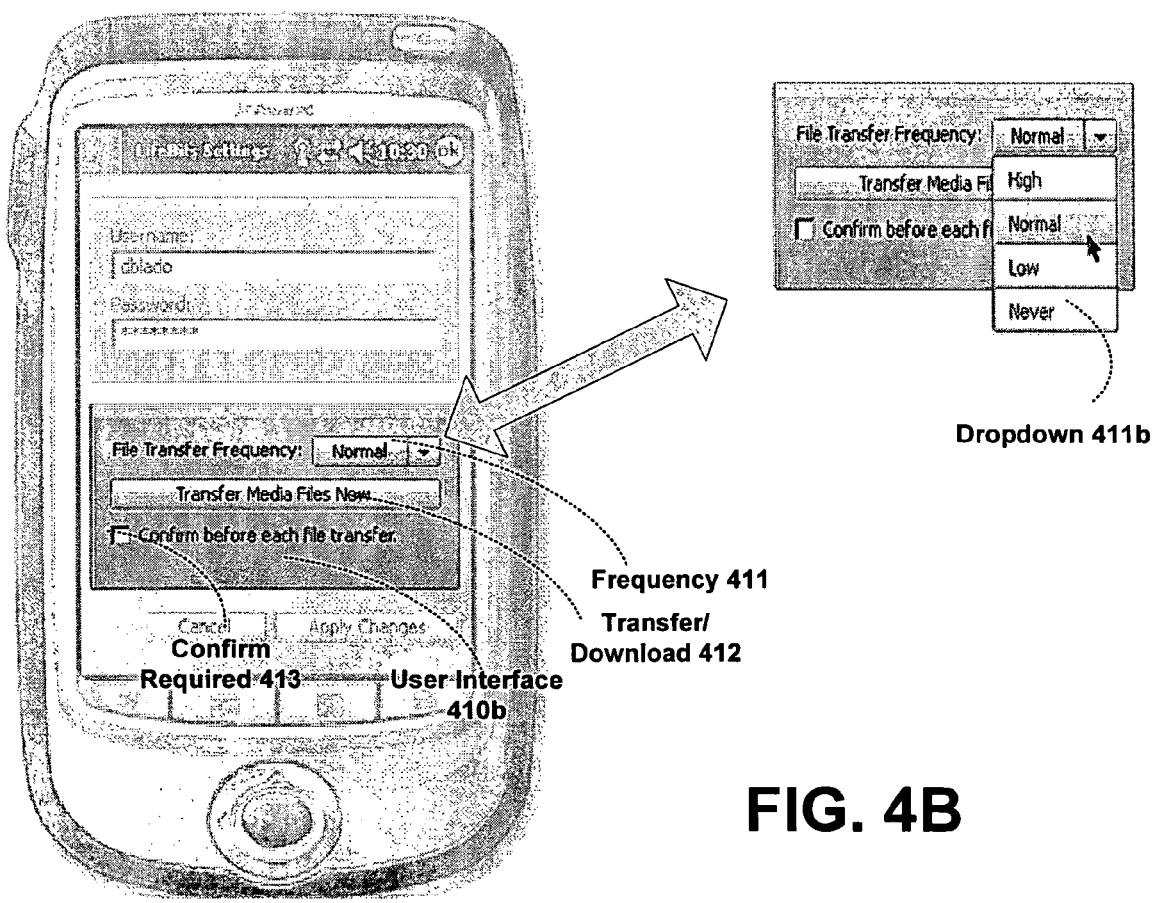

FIG. 4B illustrates some initial settings for the personal data client services of the invention after user authentication has been negotiated with the credentials. As shown in exemplary, non-limiting user interface 410b, a user can designate, as a setting, how often the device will transfer its files to the personal data servers of the invention with control 411. A user can further immediately initiate a transfer for files that the user wishes to immediately transfer via control 412. Additionally, the user can optionally require confirmation prior to beginning any file transfer, automatic or otherwise, before proceeding to transfer media files via confirmation control 413.

The file transfer frequency control 411 refers to the length of time between transfer sessions between the personal data client and the personal data servers of the invention. In one non-limiting embodiment, users are given four options including High, Normal, Low and Never, as shown in exemplary fashion in dropdown 411b of FIG. 4B.

The Transfer Media Files Now control 412 allows the user to manually initiate a file transfer session between camera enabled client and the personal data servers of the invention. This feature can be used at any time to expedite the media transfer process or to initiate a transfer even when the File Transfer Frequency control 411 is set to "Never."

With respect to the "Confirm before each file transfer" control 413, when selected, this option allows the users to manually confirm all subsequent file transfer sessions so that none occur without the user's explicit real-time assent.

Figure 4C:
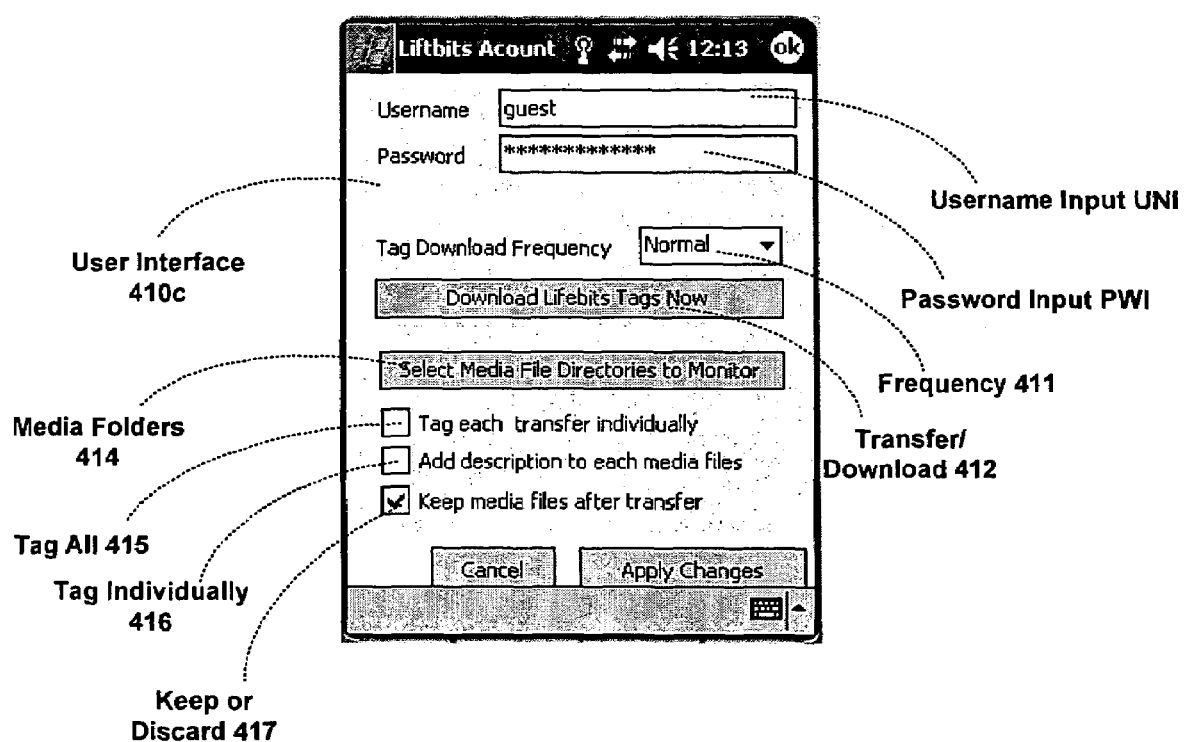

FIG. 4C shows an alternate settings screen 410c having alternate controls. For instance, in addition to controls 411 and 412, user interface 410c includes a media folders control 414, a tag all control 415, a tag individually control 416 and a keep or discard control 417. The media folders control 414 allows a user to select certain media file directories to which transfers from the device should be directed. The Tag All control 415 allows a user to indicate that he or she wishes to tag each transfer with metadata that applies to the personal data to be transferred. The Tag Individually control 416 allows a user to indicate that he or she wishes to tag each media file on the device with individual metadata, prior to initiating a transfer. The keep or discard control 417 allows a user to indicate whether, after transfer, files should be deleted to free space on the camera enabled device or to keep them on the device, at least for the time being.

Describing the Media Destination user interface option mentioned above in connection with FIGS. 3A and 3C in more detail, e.g., as also optionally initiated by control 414, the Media Destination portion of a client device allows the user to choose a location (i.e., a Media Folder) on the personal data servers of the invention to which media files will be sent upon transfer. Once a Media Destination has been established, all subsequent media files will be transferred to the destination per the file transfer settings that were selected in the "Settings" dialog, e.g., as shown in the exemplary, non-limiting implementations of the user experience in FIGS. 4B and 4C. The same Media Folder also then continues to receive subsequent media files until the user selects an alternate destination, or destinations.

Figure 5:
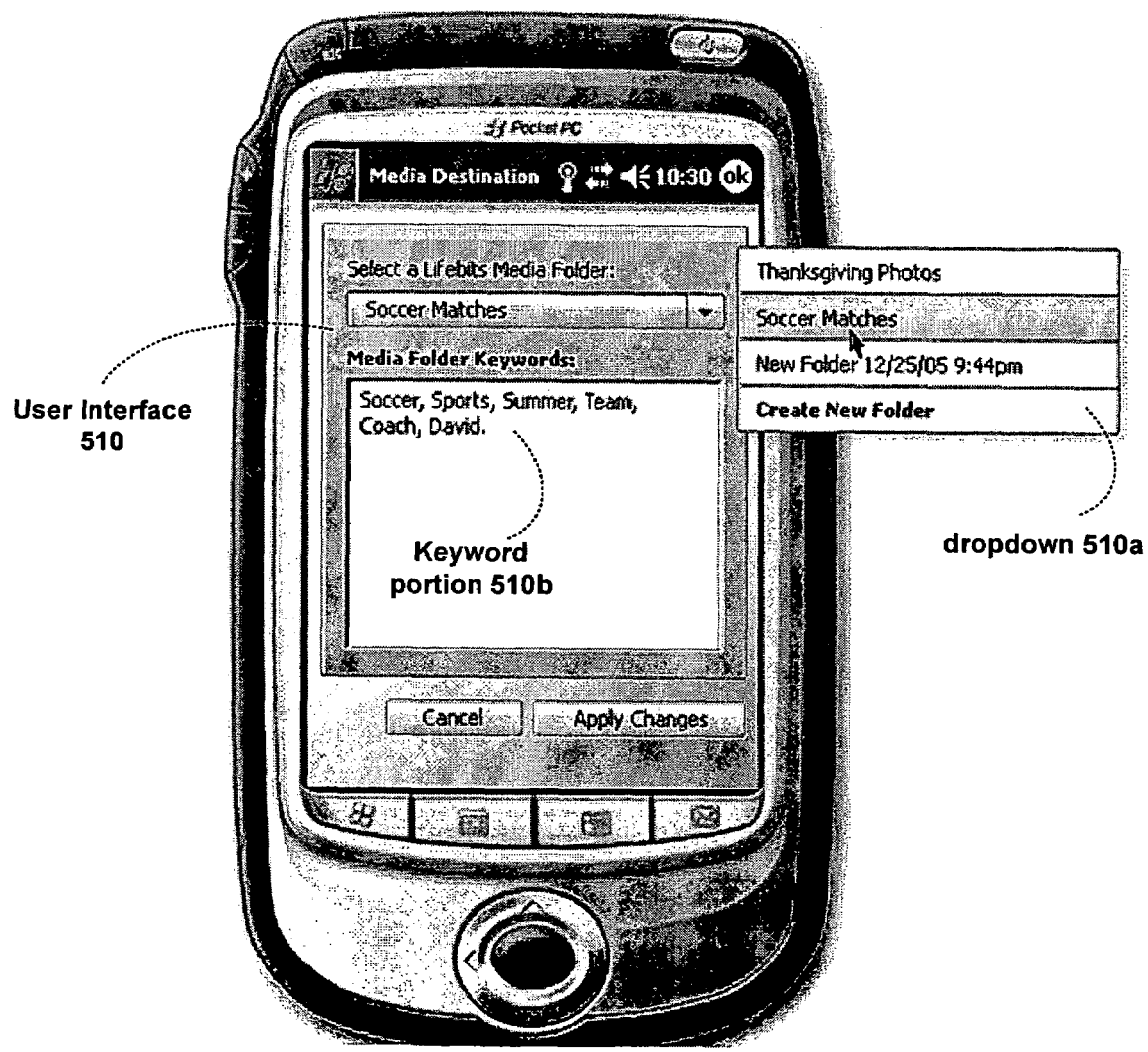
FIG. 5 illustrates an exemplary user interface for designating a media destination for media files to upload according to the techniques of the invention.

FIG. 5 illustrates an exemplary, non-limiting implementation of a Media Destination user interface 510 for allowing a user to select a media destination simply and easily. One can see that there is a dropdown 510a shown in this embodiment in which a user can select from a set of possible, or recent, folders, or allows a user to create a new folder. The media folders list contains the following options: List of Existing Media Folders and Create New Folder. The List of Existing Media Folders may contain all media folders that currently exist within the authenticated user's Web Client Account. These folders have been created at some previous point and may or may not have existing media files in them. Once a media folder is selected, e.g., in the example the "soccer matches" media folder has been selected, the associated keywords are populated into a keyword portion 510b of the user interface 510. In this regard, the user can edit the keywords in the text box, as separated by commas, and apply the changes where desired to change the keywords associated with the media folder, in this case "soccer matches." By assigning keywords to a media folder, the user is essentially defining common tags for the media files that will be placed in the folder. Media Folder keywords are generally selected to be broad or generic enough to encompass the range of media that is planned for the folder.

Table 1 illustrates some sample media folder keywords that are subject or event specific, or in the case of a new folder, no keywords yet exist, and thus they must be assigned at some point.

TABLE 1

Sample Media Folder Keywords

| Media Folder Name | Sample Keywords |
| --- | --- |
| Thanksgiving Photos | Family, Food, Turkey, Eating, Pie, Kids, Fall, Cooking, Home, November |
| Soccer Matches | Soccer, Sports, Children, Athletics, Field, Summer, Outdoors, Win, Lose, Jersey, San Jose, California, 7$^{th}$ Grade, Team. |
| New Folder Dec. 25, 2005 9:44 pm | N/A (New Media Folder: No Keywords Yet) |

Media Folders and Media Folder Keywords thus advantageously allow users to automate the process of adding redundant keywords to sets of like media, capture and tag media files simultaneously, capture multiple consecutive media files without pausing to add keywords and to insure that some relevant metadata is added to every media file.

The Create New Folder allows the user to create a new folder in his/her personal data services account from within the user interface of the camera enabled client. Doing so allows the user to create a new media folder destination on the fly when none of the existing media folders seem to apply. In one non-limiting embodiment of the invention, new Media Folders created from the device client are assigned a name on the basis of the time and date of creation. The user can then rename these Media Folders at anytime by using Media Folder Management Tools, e.g., as made available by a Web Client for personal data services account access.

Figure 6:
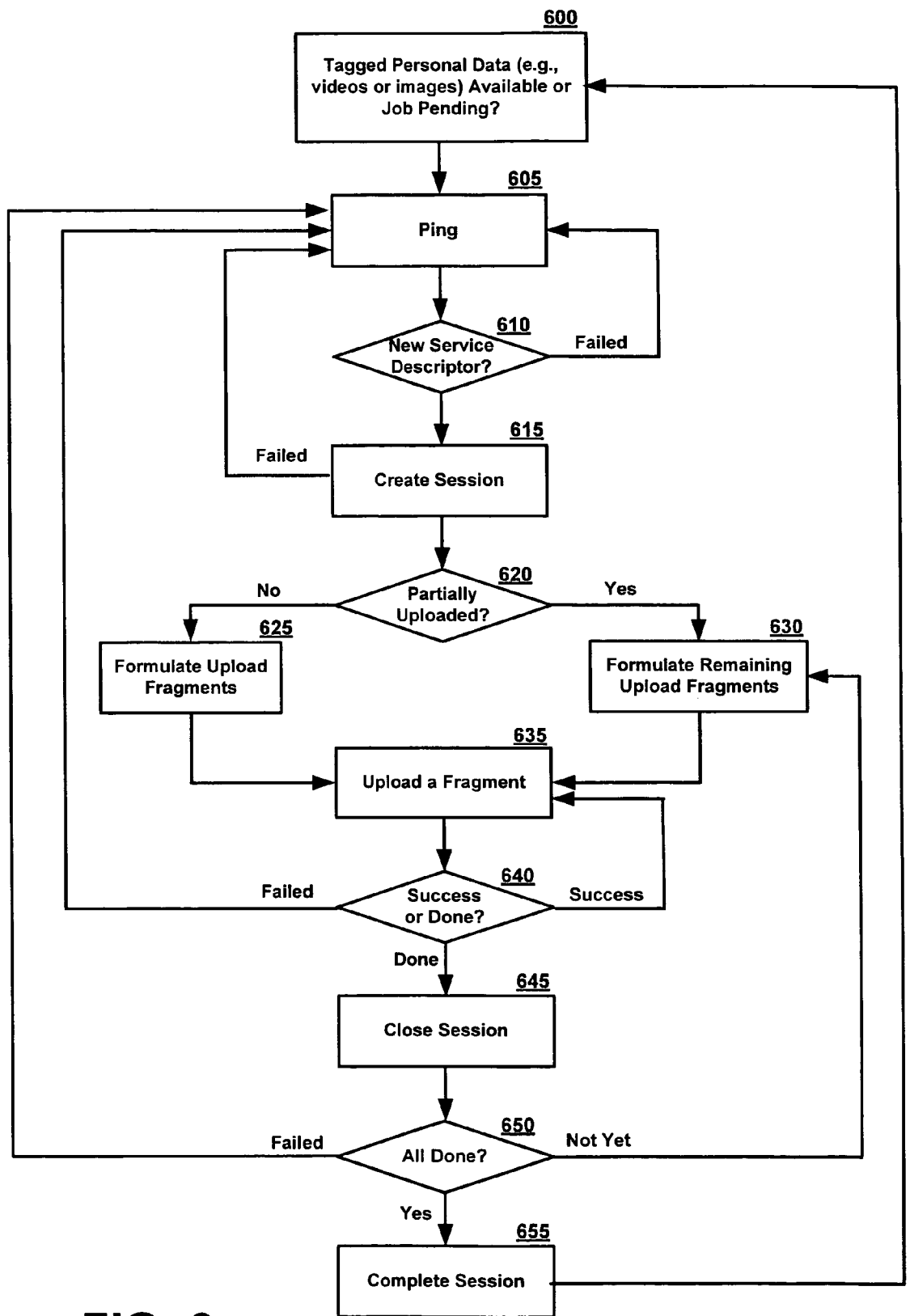
FIGS. 6 and 7 illustrate exemplary, non-limiting flow diagrams for client upload and client download processes, respectively, in accordance with the invention.

FIG. 6 illustrates an exemplary non-limiting flow diagram of an implementation of a typical client device upload to the personal data servers of the invention. At 600, it is determined whether there is any tagged personal data (e.g., videos or images) on the client device that is available for upload, or whether a job is currently pending completion. If so, then, at 605, the personal data service is pinged to obtain a new service descriptor at 610. If a new service descriptor is received, then the flow proceeds to 615 to create a session. If not, the flow returns to 605 to ping again. If the session fails in creation, then the flow also returns to 605 to ping the personal data services again. At 620, it is determined whether the target media file for upload has previously been partially uploaded (but then interrupted for some reason). If not, the flow goes to 625 where the fragments of the target media file are formulated so they are ready for upload. If so, the flow goes to 620 where the remaining fragments of the target media file are formulated so they are ready for upload. In either case, the flow proceeds to 635 where a fragment is uploaded. A determination is made at 640 as to whether the fragment was successfully uploaded, and if so, whether the entire target media file is done uploading. If at 640, however, failure has occurred in uploading the fragment, then the flow again returns to 605 to ping and begin the attempt again. If at

640, the fragment is uploaded successfully, but the target media file is not done, then the flow returns to 635 to enable the next fragment to begin upload. The process repeats in this fashion until the target media file is completely uploaded whereby the flow proceeds to 645 where the session for that target media file is closed. At 650, if all media files have been uploaded, i.e., if the upload is all done, then the flow proceeds to 655 where the entire session is ended, and the flow returns to the beginning at 600. If not all target media files have been uploaded, then the process proceeds to 630 where additional fragments for upload are formulated. If failure occurs for some reason at 650, then the flow again returns to 605 to try again. In this exemplary, non-limiting fashion, media files and their corresponding metadata can be automatically transmitted from a camera enabled device to the personal data services in accordance with the invention.

With respect to sessions, in one embodiment, for example, a video clip from a user on the server side is uniquely identified by the Username information plus any clip metadata tags plus the local video clip filename plus a date and/or time. In this regard, subsequent create session requests from any device receive the same session ID the first time the upload is requested and a session is created.

Figure 7:
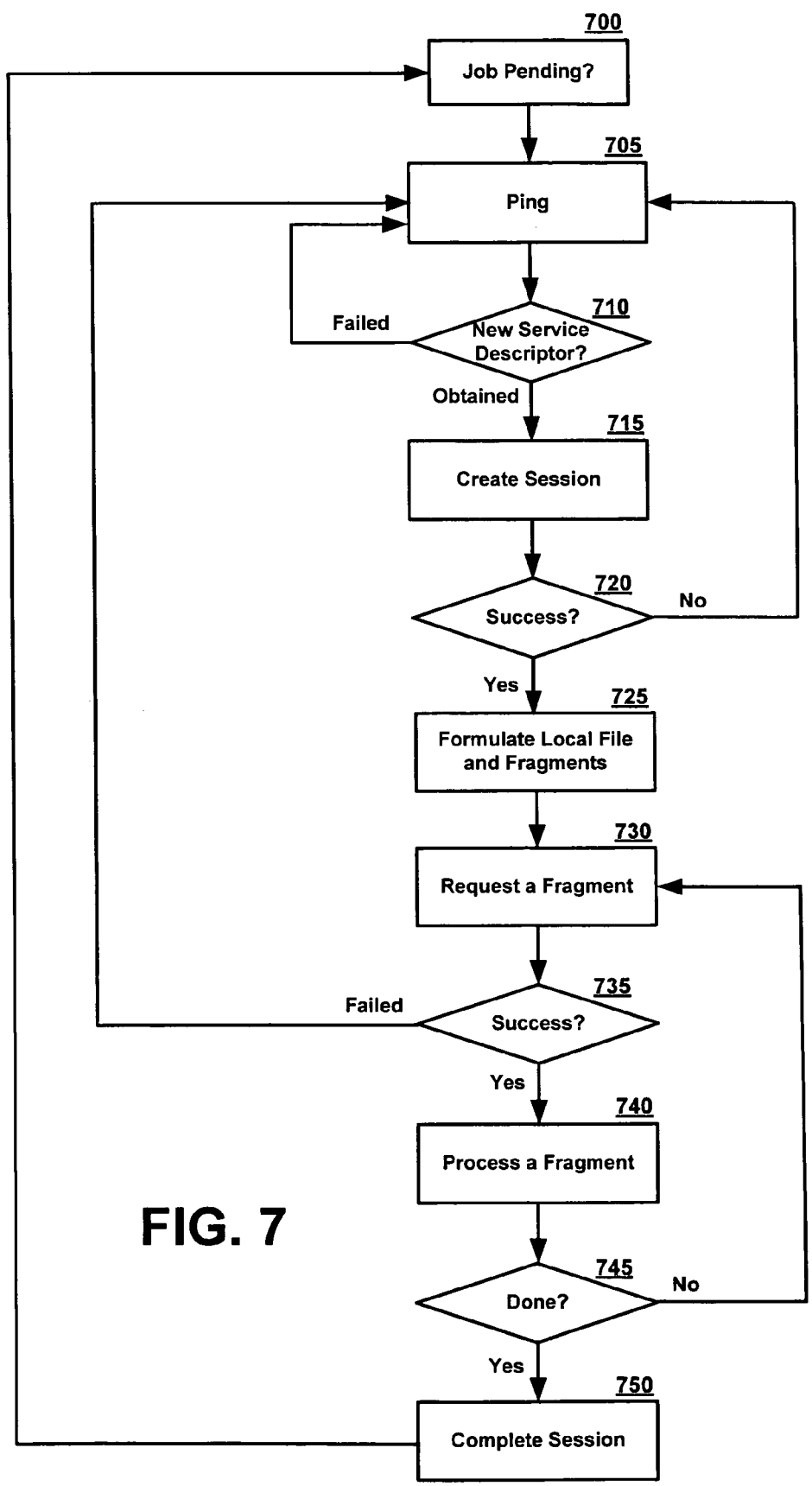

FIG. 7 illustrates an exemplary non-limiting flow diagram of an implementation of a typical client device download from the personal data servers of the invention. At 700, it is determined whether there is a download job pending. If so, then, at 705, the camera enabled client device pings the personal data services of the invention. If a new service descriptor is received at 710, then a session is created at 715. If the service descriptor is not yet received, the flow returns to 705 to ping the personal data services again. At 720, if the session is not successfully created, the flow returns to 705 to ping again. If the session has successfully been created, then the flow proceeds to 725 where local files and fragments are formulated in preparation for download. At 730, next, a fragment is requested. If the fragment is successfully received at 735, then the flow proceeds to 740 to process the fragment. If not, then the flow once again returns to 705 to ping again. After the fragment is processed successfully at 740, then at 745, it is determined whether there are any more fragments for download. If there are, then the flow returns to 730 wherein the next fragment is requested. If the download is done, then the session completes at 750, and the flow may return to the beginning at 700 to wait for another download job. In this regard, the client device can normally initiate requests at will in accordance with the invention in order to receive file downloads.

A smart transfer protocol is also provided in accordance with the invention that defines a core communication protocol to support clients using personal data services to upload and download information and video clips to and from the personal data servers of the invention securely and reliably. In one non-limiting embodiment described herein, this protocol is based on and extends the hypertext transfer protocol version 1.1 (HTTP/1.1). The smart transfer protocol is designed in a way that the service can be implemented at the server side as filters for maximum efficiency. The protocol supports reliable video clip upload from all customer devices from "anywhere." The protocol may be designed to support server side clustering and out of order upload/download. The protocol may include inherent capacity to defeat men-in-middle attacks and denial of service (DOS) attacks. The protocol can be implemented such that any reversely engineered service will be unable to steal or access data on clients that use the personal data services of the invention.

With respect to packet format, any packet format may be utilized, though in one implementation, packets of the smart transfer protocol include part or all of the following fields:
LIFEBITS_POST remote-URL HTTP/1.1
LIFEBITS-Source: source id
LIFEBITS-Packet-Type: packet type
LIFEBITS-Session-Id: session id
LIFEBITS-Content-Name: filename
LIFEBITS-Content-Length: length
LIFEBITS-Content-Range: byte ranges/total-length
LIFEBITS-Content-Encoding: encoding
LIFEBITS-Content-Checking: data integrity checking code In this non-limiting implementation of the smart transfer protocol, the source id and session id are encrypted fields designed to identify the device, the customer, and other related critical information. These are designed such that a hardware implementation is possible on the server side to fend off DOS attacks and to validate content source. Byte ranges describes the content range of the file received or requested. Encoding defines the encoding of the data and content checking defines data integrity checking method for the content. During request, the device lists the supported encoding methods. During ack for the request, the server replies with the encoding method for the session. The session id field may be encrypted to prevent reversely engineered services from stealing from client devices in accordance with the invention.

In addition to the source id as a base for certificate based authentication, the protocol supports basic or digest based user authentication. The authentication process may follow the standard HTTP authentication process.

Request packets of the protocol describe requests sent from client devices. Most requests work in a synchronized mode where there is one outstanding request at any given time, whereby acknowledgement for the current request from the server is awaited for before sending another request. Fragment transfer requests may be queued (asynchronous). Thus, there may be multiple fragment requests (limited only by the maximum queue length of a particular implementation) being sent out before the client receives an acknowledgement packet from the personal data Web service of the invention. Table 2 lists some exemplary non-limiting request packets that are sent to the server for upload/download jobs. Packets may include an optional field for validation purposes to support hardware implementation of filtering to fend off DOS attacks.

TABLE 2

Type of Request Packets

| Request packet | Purpose | Operation Mode |
| --- | --- | --- |
| Ping | Checks network and service availability with optional security negotiation. | Synchronized |
| Create-Session | Establishes a connection, negotiates security, and requests an upload or download session with the server. | Synchronized |
| Fragment | Sends/gets a fragment of the file from the server. | Synchronized or queued for upload; Synchronized for download |
| Close-Session | Ends the file upload/download session. | Synchronized |
| Cancel-Session | Cancels the file upload/download session with the server. | Synchronized |

Response packets describe responses sent from the personal data Web service of the invention to the client devices.

Table 3 lists some exemplary, non-limiting response packets that are sent to client devices in accordance with the invention.

TABLE 3

Response Packets

| Response packet | Purpose |
| --- | --- |
| Ack for Ping | Acknowledges the Ping request and returns the service descriptor and server side video clip status. |
| Ack for Create-Session | Acknowledges the Create-Session request and returns a session identifier that the client uses on all subsequent requests to identify the transfer session. In case a file has been partially uploaded (an existing session exist), it returns the existing server side session id and the un-uploaded range of the file. |
| Ack for Fragment | For upload requests, acknowledges the Fragment request and writes the fragment to the upload file on the server. For download requests, send out the file fragment. |
| Ack for Close-Session | Acknowledges the Close-Session request and releases all resources associated with the session if a final audition shown the file has been uploaded. Otherwise returns the un-unloaded range of the file. |
| Ack for Cancel-Session | Acknowledges the Cancel-Session request and releases all resources associated with the session. |

Figure 8:
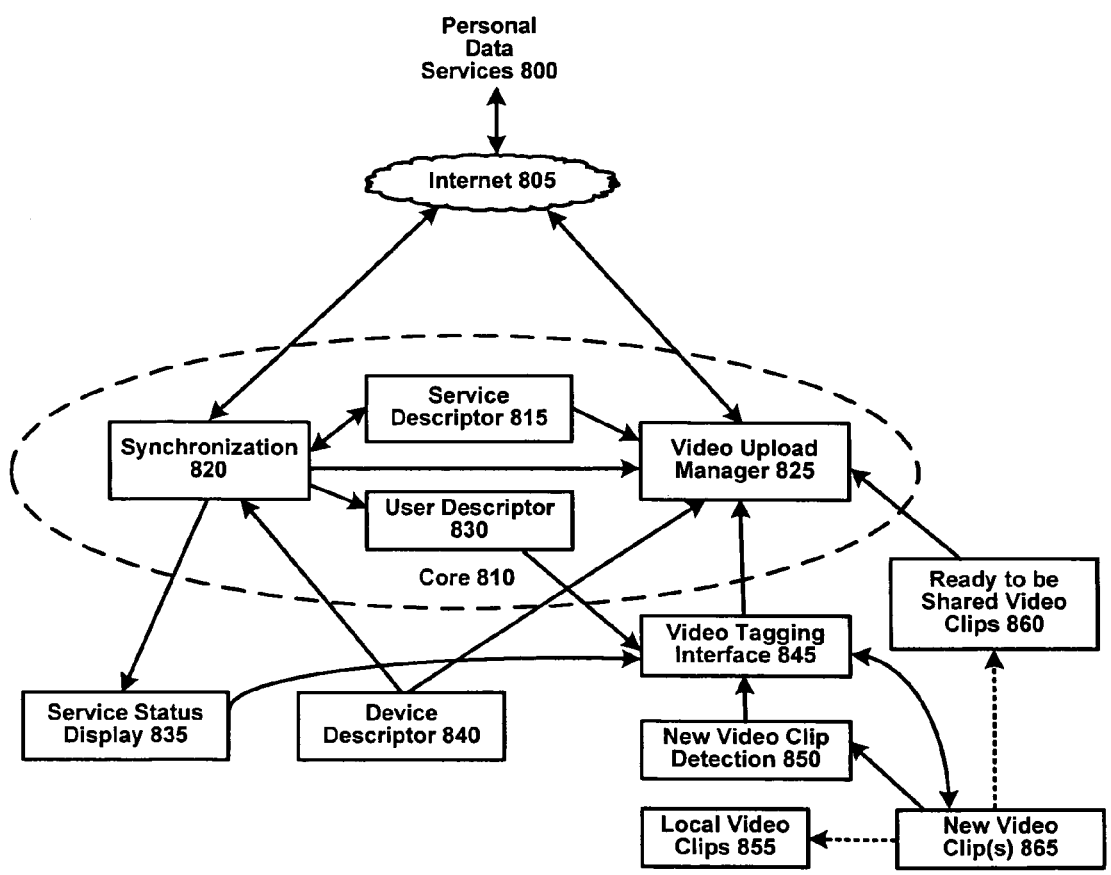
FIG. 8 illustrates exemplary, non-limiting interaction among client software components provided in accordance with the invention.

FIG. 8 illustrates an exemplary non-limiting client side implementation of software components in accordance with the invention that connect to a network 805, such as the Internet, to gain access to the personal data services 800 of the invention. The client includes a core set of components 810 inside the dotted oval including a sync component 820 for handling synchronization tasks, a service descriptor component 815 for handling service descriptors, a video upload manager 825 for managing video (or image) uploads and a user descriptor component 830 for handling user descriptors. The invention also includes a service status display component 835 for indicating various information about the status of the personal data services of the invention, a device descriptor component 840 for maintaining information pertinent to the device, a video tagging 845 for handling metadata tagging of video, a new video clip detection component 850 for detecting that a new video clip is resident on the device, storage 865 for new video (or image) captures, local storage for video clips 855, and also a component 860 for receiving videos that are ready to be shared directly with other users. The arrows show in exemplary fashion various non-limiting ways in which the components interoperate to enable the rich user experience around automatic tagging and transmission of images and video to personal data services in accordance with the invention.

In this regard, on the client side, in one embodiment, uploads/downloads are managed by a background service called a Transfer Manager, which manages two job queues: one for upload and one for download (See FIGS. 6 and 7, respectively, for exemplary process flows). The implementation of the Transfer Manager may take different forms for different platform/devices. In one embodiment, whenever possible, the Transfer Manager presents a UI for the user to check for and control upload/download processes.

Figure 9:
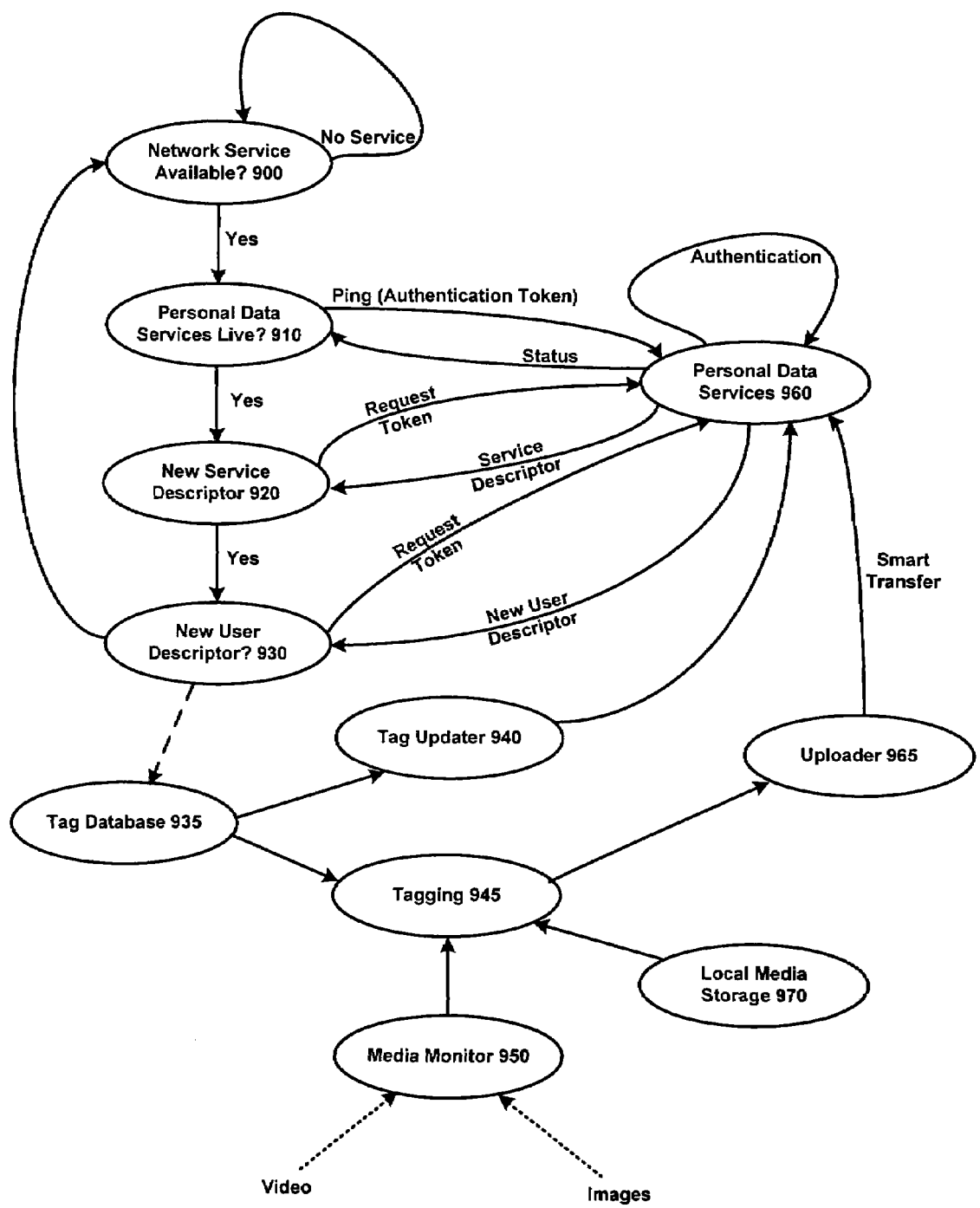
FIG. 9 illustrates exemplary, non-limiting interaction among client software and server side components for implementing the personal data services in accordance with the invention.

With respect to server side implementation of software, FIG. 9 illustrates some exemplary, non-limiting components and processes that take place on a personal data server in accordance with the invention. In this regard, the transfer protocol may be implemented on the server side in a variety of ways, however, preferably, the session information is managed by a database that support clustering. The session database acts as the center to achieve data synchronization.

In more detail, at 900, a check by a client device is made to ensure network service. If available, then a check is made to determine if the personal data services of the invention are live at 910. This is achieved via a ping, and status return from personal data services 960, which handles authentication processes in connection with a user login. At 920, a new service descriptor is requested of the personal data services 960. At 930, a new user descriptor is requested of the personal data services 960, which leads to discovery of a user's set of metadata tags from the tag database 935. A tag updater component 940 consults with personal data services 960 and handles any needed updates of the tag information in tag database 935. In operation, media monitor 950 monitors for incoming personal data to a client device, including video and image captures. Tagging component 945 tags the personal data according to any of the various processes described herein for automatically and/or manually tagging the personal data. Tagging component 945 can also handle tagging any local media files stored on the device at 970. Finally, uploader component 965 handles all of the upload requests to transfer tagged personal data from the client device to the personal data services 960, e.g., via the exemplary smart transfer protocol described herein.

With respect to an exemplary protocol for communications between a server of the invention and a client, an exemplary non-exhaustive and non-limiting set of commands will now be described. Assuming basic authentication, the client side may include the following commands: Request Tags, Request a Service Descriptor, Update Tags, Upload a Video Clip or Image, and Request Service Status.

For a Request Tag command, in operation, a client may send this request to a server side script so the client can obtain an up-to-date user descriptor from the server. In one embodiment, the parameters for the universal resource identifier (URI) provide the script with information for appropriate user descriptor generation. The script queries the database with the user name and when the last user descriptor was generated to produce the right answer. A UserID may be also be added for certificate based authentication. Similarly, for a Request a service descriptor command, in exemplary operation, a client sends the request to a server side script so it can get an up-to-date service descriptor from the server.

For an Update Tags command, the client posts this request to a server side script to update user descriptor on the server. For an Upload a video clip command, the URL is server side script for uploading the video clip. A Service status request command is the Web address for the client to "ping" the personal data Web services of the invention. A Service status request acts as the interface point for clients to update service status such as clips added, deleted, and modified so the client can report such changes to the user. In one embodiment, the user name and last ping time provide the script to query the data so it can generate correct response.

The Service Descriptor file of the invention defines the personal data services of the invention for clients, thereby increasing the flexibility of the personal data services enabled of the invention. In this regard, it is noted that the personal data services of the invention can be redirected by a rudimentary web server. In a non-limiting implementation of the service descriptor file, an XML file format is defined as follows:

```xml
<?xml version="1.0" encoding="ISO-8859-1" ?>
- <LifebitsServiceDescriptor>
    <date>date generated</date>
    <username>User name</username>
    <password>Encrypted user password (userid)</password>
    <LifeBitServiceURL>FullLifeBitsServiceURL </LifeBitServiceURL >
    <pingURI> Pingactionverb</pingURI >
    <servicedescriptorURI> GetServiceDescriptoractionverb
    </dervicedescriptorURI >
    <userdescriptorURI > GetTagsactionverb </userdescriptorURI >
    <userdescriptorupdateURI UpadteTagsactionverb
    </userdescriptorupdateURI>
    <video-uri-requestURI > VideoUploadactionverb
    </ video-uri-requestURI >
</LifebitsServiceDescriptor>
```

The field names of the exemplary XML file format may be explained as follows:

Date: identify when the descriptor is generated (programmed). Client transmits this field to the server during "ping" so server can determine if the service descriptor needs to be updated in the reply. It is expected that this descriptor needs only infrequent changes.

Username: identify the user for authentication purposes.

Password: this is a user id generated by the server. It is basically a certificate for the user so we may implement certificate based authentication so user does not need too much interactions with the UI to maintain security.

LibeBitsServiceURL: the root script locator.

pingURI: action verb for ping.

serviceDescriptorURI: action verb to get a service descriptor.

userdescriptorURI: action verb to get metadata tags.

userdescriptorupdateURI: action verb to update the metadata tags.

video-uri-requestURI: action verb to upload a video clip (or image).

In this respect, the service descriptor of the invention is designed for easier management of the personal data services for various clients that are made by various companies. Instead of preprogramming everything into the clients, the client is able to request/update details from the server when it is connected, so the client always has the most up-to-date service information. This makes the client side software much easier to manage with minimal updates. Another benefit of this flexible design is that the personal data services of the invention can be re-directed according to various rules that are set at manufacture, based on user name etc., for various purposes.

Exemplary Non-Limiting Network and Operating Environments

Figure 10A:
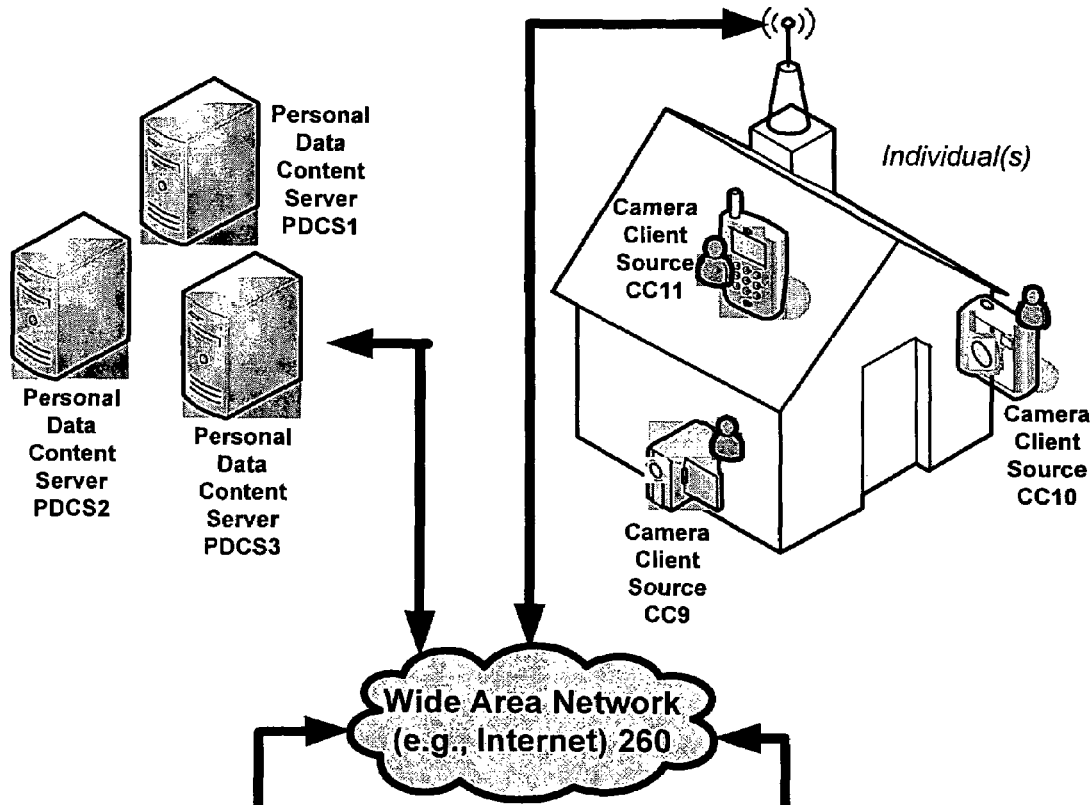
FIG. 10A illustrates an exemplary non-limiting network architecture for uploading and downloading data between clients and servers in accordance with the invention.
Figure 10A:
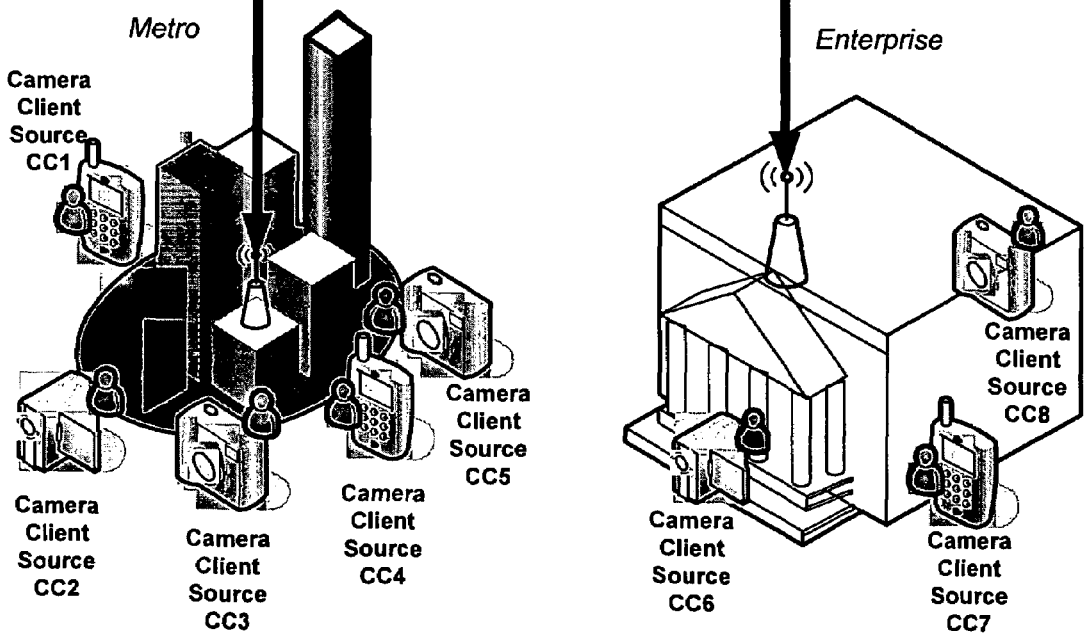

FIG. 10A illustrates a generalized network architecture and device synchronization that is achieved according to the personal data services of the invention. In the. diagram, one can see that the invention can apply to individuals, organizations and enterprises, as well as to whole metropolitan areas. Utilizing existing network transmission infrastructures, one can see that the invention is scalable to many different camera client sources, such as devices CC1, CC2, CC3, CC4, CC5, CC6, CC7, CC8, CC9, CC10, etc., whether tethered via a PC, or connected directly to the network 260, which in turn is communicatively coupled to the personal data content servers PDCS1, PDCS2, PDCS3, etc. In this regard, the network employs a bi-directional wired and/or wireless infrastructure, allowing for the transfer of content and metadata among a wide range of embedded devices and personal data servers as described herein. In various non-limiting embodiments, XML is used at the application layer as a common interchange format between the user's information in the database, and the presentation of that information on the device.

With respect to connectivity of client devices, the physical connection to the personal data services of the invention may be established via any Internet enabled network. The type of network can be, but is not limited to wireless Ethernet (802.11x), GSM, CDMA, EV-DO, USB connection though a PC, Bluetooth, and so on.

The following description sets forth some exemplary networks and non-limiting operating environments for the personal data transmission services provided in accordance with the present invention. The below-described operating environments should be considered non-exhaustive, however, in that there are a variety of networks of different types that are known to those of ordinary skill in the art, any one of which is suitable for transporting personal data in accordance with the transmission services of the invention. One can also appreciate that the invention may not only be incorporated into a variety of existing network architectures for the purpose of transporting data according to the various protocols defined in accordance with the invention, but also into alternative architectures for communication networks that are adopted in the future as well.

The global system for mobile communication ("GSM") is one of the most widely utilized wireless access systems in today's fast growing communication systems, and is a non-limiting example of a network that may be used for data communications and transmissions in accordance with the personal data transmission services enabled by the invention. GSM provides circuit-switched data services to subscribers, such as mobile telephone or computing device users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x "), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that may become available in time. In this regard, the techniques of the invention may be applied independently of the method of data transport, and does not depend on any particular network architecture, or underlying protocols.

Figure 10B:
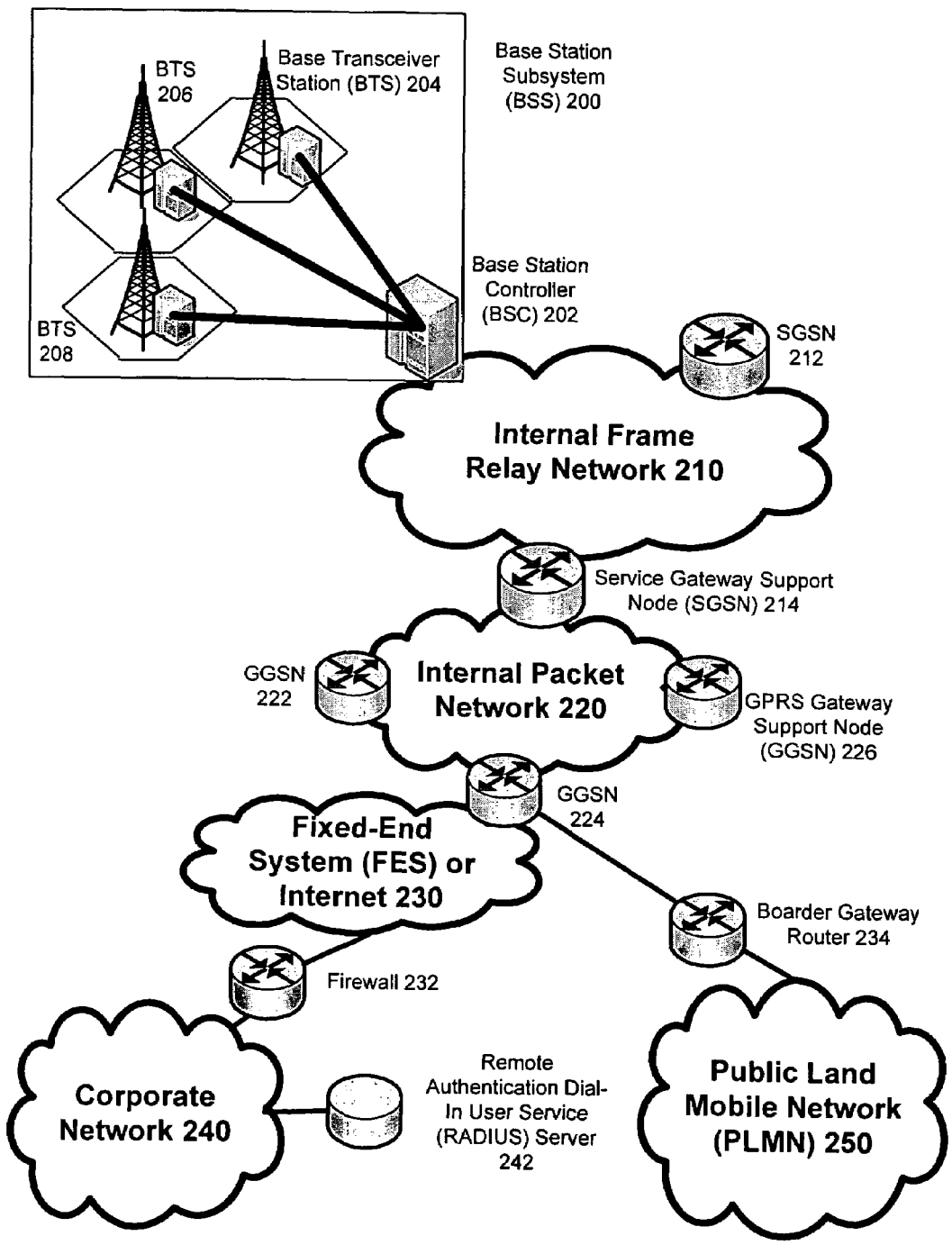
FIG. 10B illustrates an overview of a network environment suitable for service by embodiments of the invention.

FIG. 10B depicts an overall block diagram of an exemplary packet-based mobile cellular network environment, such as a GPRS network, in which the invention may be practiced. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices become connected to the wireless network. In exemplary fashion, the packet traffic originating from user devices is transported over the air interface to a BTS 208, and from the BTS 208 to the BSC 202. Base station subsystems, such as BSS 200, are a part of internal frame relay network 210 that may include Service GPRS Support Nodes ("SGSN") such as SGSN 212 and 214. Each SGSN is in turn connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via boarder gateway router 234. The Remote Authentication Dial-In User Service ("RADIUS") server 242 may be used for caller authentication when a user of a mobile cellular device calls corporate network 240.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices that may include personal data and are connected via a communications network. For instance, personal data from a first device can be transmitted to a server in accordance with the invention, via wired or wireless means, or a combination thereof. Therefore, the present invention should not be limited to any single embodiment, but rather should be construed in breadth and scope in accordance with the appended claims.

What is claimed:

1. A system for using a camera enabled computing device for capturing media files, including video, audio and/or image data, comprising:
    a first camera enabled computing device component for synchronizing with metadata information and personal information about a user of the camera enabled computing device stored on at least one service computing device that hosts personal data services, wherein said metadata information is used for tagging a media file recorded by said camera enabled computing device, and wherein the personal information comprises at least one date corresponding to one of the following: an event in the user's life, an event in the life of a person in the user's family, and a holiday celebrated by the user;
    a second camera enabled computing device component for displaying the metadata information, suggesting a subset of metadata information which may be appropriate for the media file based on the at least one date of the personal information about said user, and receiving input from said user of the camera enabled computing device that associates a subset of the metadata information with the media file;
    a third camera enabled computing device component for uploading the media file and the associated subset of metadata information to said at least one computing device that hosts personal data services component; and
    a service computing device component for receiving the uploaded media file and, when the metadata information associated with the media file is identified as unknown, presenting a request for information related to the event whereby the information provided in response to the request is stored on said at least one service and used to generate additional metadata information for subsequent synchronization with the camera enabled computing device.

2. A camera enabled computing device according to claim 1, wherein the metadata information includes metadata information that, when associated with the media file via the second component, designates the media file as requiring supplemental metadata information not found in the metadata information.

3. A camera enabled computing device according to claim 1, wherein the third component for uploading the media file includes a component for trickle uploading the media file and the associated subset of metadata information to said at least one computing device that hosts the personal data services when communicatively coupled via a connection to said at least one computing device.

4. A camera enabled computing device according to claim 1, further comprising:
    a fourth component for allowing navigation and viewing, by the user of the camera enabled computing device, of media files stored on said at least one computing device that hosts personal data services.

5. A camera enabled computing device according to claim 1, wherein said second component for displaying the metadata information includes a component for receiving metadata modification input from a user and for modifying the metadata information based on the metadata modification input.

6. A camera enabled computing device according to claim 1, wherein the second component processes the media file or information about the media file, and based on the processing, displays a second subset of metadata information that is more likely to be input by said user as associated with the media file than the full set of metadata information.

7. A camera enabled computing device according to claim 1, further comprising:
    an authentication component for authenticating the user of the camera enabled computing device or the camera enabled computing device to the at least one computing device that hosts the personal data services.

8. A camera enabled computing device according to claim 1, wherein the first component for synchronizing with metadata information stored on at least one computing device receives a service descriptor file from the at least one computing device that hosts personal data Web services.

9. A camera enabled computing device according to claim 1, further comprising:
    a location determination component for determining a location of the camera enabled computing device wherein the third component uploads the media file and the location of the camera enabled device when the media file was captured.

10. A camera enabled computing device according to claim 1, further comprising:
a software updating component for updating software relating to said first, second or third component by receiving software data from said at least one computing device that hosts personal data services, wherein the software data is used by the software updating component in connection with updating said software.

11. A camera enabled computing device according to claim 1, wherein the second component displays metadata information based on at least one algorithm that makes suggestions for the metadata information so that the metadata information that is displayed is an intelligent subset of metadata information.

12. A camera enabled computing device according to claim 11, wherein to display the intelligent subset of metadata information, the at least one algorithm analyzes data representative of at least one of a past keyword entered by a user, a past media capture date, a past media capture time, a past media capture location, a current date, a current time, a current location and user account information.

13. A user interface for a camera enabled computing device, comprising:
a display for displaying information or rendering media data pertaining to a current media file captured by the camera enabled computing device; and
at least one input control for displaying a set of metadata tags that are unique to a user of the camera enabled computing device, the at least one input control comprising a selector for selecting a subset of the set of metadata tags and associating the subset of metadata tags with the current media file, wherein the at least one input control is configured to suggest a subset of metadata information which may be appropriate for the media file based on at least one date of personal information about said user, wherein the at least one date of personal information comprises at least one date corresponding to one of the following:
an event in the user's life, an event in the life of a person in the user's family, and a holiday celebrated by the user;
whereby the current media file and the subset of metadata tags are automatically uploaded to a personal data server via a network according to at least one pre-determined upload setting on the camera enabled computing device, wherein the set of metadata tags includes an unknown metadata tag that designates the media file as requiring a metadata tag not stored in the set of metadata tags whereby the unknown tag causes a service to present a request for information related to the event whereby the information provided in response to the request is stored on said at least one service and used to generate additional metadata information for subsequent display by the camera enabled computing device.

14. A user interface according to claim 13, wherein the at least one input control includes an input control for designating recipients for the current media file, wherein the current media file is automatically made accessible by the designated recipients.

15. A user interface according to claim 13, wherein the at least one pre-determined upload setting includes a frequency that specifies how often to initiate upload operations for the camera enabled computing device.

16. A user interface according to claim 13, wherein the at least one input control includes at least one dropdown list of the set of metadata tags.

17. A method for downloading metadata to a camera enabled computing device and receiving capture data from the camera enabled computing device, comprising:
receiving personal information about a user of the camera enabled computing device, wherein the personal information comprises at least one date corresponding to one of the following: an event in the user's life, an event in the life of a person in the user's family, and a holiday celebrated by the user;
receiving a request from the camera enabled computing device for metadata information to apply to capture events recorded by the camera enabled computing device;
transmitting metadata information to the camera enabled computing device and the at least one date of the personal information, wherein said camera enabled computing device is configured to suggest a subset of metadata information which may be appropriate for the media file based on the at least one date of the personal information; and
automatically receiving capture data from the camera enabled computing device, wherein the capture data includes data representative of a subset of said metadata information, wherein said subset is previously assigned to the capture data by a user of the capture enabled computing device; and
in response to an unknown metadata designation, the at least one computing device provides a notification to the user that an event has unknown metadata associated with it whereby the service generates additional metadata information.

18. A method according to claim 17, wherein the transmitting includes transmitting metadata information to the camera enabled computing device that has since been input and stored as metadata information since the metadata information was previously transmitted to the camera enabled computing device.

19. A method according to claim 17, further comprising:
automatically authorizing a third party to view the capture data.

20. A method according to claim 17, further comprising transmitting the capture data to an independent media service provider for rendering by the independent media service provider.

21. A method according to claim 17, further comprising automatically organizing the capture data into a media storage collection based on the subset of metadata information.

22. A computing device comprising means for performing the steps of claim 17.

* * * * *